US008188191B2

(12) United States Patent
Ikenaga et al.

(10) Patent No.: US 8,188,191 B2
(45) Date of Patent: May 29, 2012

(54) POLYOLEFIN POLYMER CONTAINING VINYL GROUPS AT BOTH ENDS AND COMPOSITION THEREOF

(75) Inventors: Shigenobu Ikenaga, Ichihara (JP); Keiji Okada, Ichihara (JP); Yoshiki Shimokawatoko, Chiba (JP); Akihiro Matsuda, Ichihara (JP); Shigekazu Matsui, Chiba (JP); Masahiro Enna, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 168 days.

(21) Appl. No.: 12/310,545

(22) PCT Filed: Aug. 29, 2007

(86) PCT No.: PCT/JP2007/066739
§ 371 (c)(1),
(2), (4) Date: Feb. 27, 2009

(87) PCT Pub. No.: WO2008/026628
PCT Pub. Date: Mar. 6, 2008

(65) Prior Publication Data
US 2010/0004393 A1    Jan. 7, 2010

(30) Foreign Application Priority Data

Aug. 31, 2006  (JP) .................... 2006-236084

(51) Int. Cl.
C08F 8/50       (2006.01)
C08F 210/06     (2006.01)
C08L 23/26      (2006.01)
C08F 4/642      (2006.01)

(52) U.S. Cl. ........ 525/245; 525/105; 525/106; 525/210; 525/216; 525/324; 525/938; 526/281; 526/308; 526/339; 428/523

(58) Field of Classification Search ............. 526/282, 526/339, 281, 308; 525/938, 105, 106, 210, 525/216, 245, 324; 522/158, 160, 161; 428/523
See application file for complete search history.

(56) References Cited

U.S. PATENT DOCUMENTS

| 5,200,439 A * | 4/1993 | Asanuma ............. 522/157 |
| 5,728,917 A * | 3/1998 | Grubbs et al. .......... 585/653 |
| 5,747,620 A * | 5/1998 | Machida et al. ......... 526/348.3 |
| 6,864,315 B1 | 3/2005 | Hakuta et al. |
| 7,109,284 B2 | 9/2006 | Ishii et al. |
| 7,208,548 B2 | 4/2007 | Hakuta et al. |
| 2010/0168352 A1 * | 7/2010 | Arriola et al. .......... 526/171 |

FOREIGN PATENT DOCUMENTS

| JP | 4-185687    | 7/1992 |
| JP | 7-138327    | 5/1995 |
| JP | 2001-31809  | 2/2001 |
| JP | 2003-73412  | 3/2003 |
| JP | 2003-342326 | 12/2003 |
| JP | 2004-143360 | 5/2004 |
| JP | 2005-336091 | 12/2005 |
| JP | 2006-183000 | 7/2006 |
| WO | WO 01/98407 | 12/2001 |

OTHER PUBLICATIONS

Entry for "Decalin" in Hawley's Condensed Chemical Dictionary, 14th Ed., 2002, J. Wiley & Sons, Inc.*
Ishihara et al, Synthesis of Poly(propylene-ran-1,3-butadiene) and Its Metathesis Degradation with Ethylene, Macromolecules, vol. 36, No. 26, 2003, 9675-9677.*
Machine translation of JP 2004-143360A; publication date: May 2004.*
Supplementary Search Report mailed May 4, 2010 received in corresponding European Application No. 07806216.3.
International Search Report mailed Oct. 23, 2007 received in corresponding International Application No. PCT/JP2007/066739.
Shiono, Takeshi et al; "Synthesis of α,ω-divinylpolyethylene-like polymers from cis-1,4-polybutadiene using partial hydrogenation and metathesis degradation with ethylene," Makromolekulare Chemie, Rapid Communications, vol. 14, No. 6, pp. 323-327, Jun. 199.
Dounis, Panagiotis et al., "Ring-opening metathesis polymerization of monocyclic alkenes using molybdenum and tungsten alkylidene (Schrock-type) initiators and $^{13}$C nuclear magnetic resonance studies of the resulting polyalkenamers," Polymer, vol. 36, No. 14, pp. 2787-2796, Jan. 1, 1995.
Database WPI Week 200447, May 20, 2004, XP002578815, 3 pgs.

* cited by examiner

Primary Examiner — Fred M Teskin
(74) Attorney, Agent, or Firm — Foley & Lardner LLP

(57) ABSTRACT

The present invention is a polyolefin polymer containing vinyl groups at both ends thereof, and a composition and a molded product containing the polymer, wherein the polymer contains a constitutional unit derived from at least one selected from the group consisting of ethylene (a), an α-olefin (b) having 3 to 20 carbon atoms, and a cyclic olefin (c), and (1) a ratio of terminal vinylation is 70% or more relative to all of both ends of molecular chains, and (2) an intrinsic viscosity [η] is in the range of 0.01 to 10 dl/g as measured in a decalin solution at 135° C.

The polymer of the present invention may be molded by a LIM molding, an injection molding, a transfer molding, a compression molding, and the like, and is excellent in acid resistance, gas permeation resistance, hydrolysis resistance, and dynamic fatigue resistance. From the polymer, a thermoplastic resin composition and a crosslinkable resin composition, and a crosslinked composition having excellent mechanical characteristics are obtained.

13 Claims, No Drawings

POLYOLEFIN POLYMER CONTAINING VINYL GROUPS AT BOTH ENDS AND COMPOSITION THEREOF

TECHNICAL FIELD

The present invention relates to a polyolefin polymer containing vinyl groups at both ends thereof and a composition thereof, and further to a use of the composition. More specifically, the present invention relates to a polyolefin polymer containing vinyl groups at both ends thereof that can be molded by an extrusion molding, a LIM (Liquid Injection Molding) molding, an injection molding, a transfer molding, and the like, and to a resin composition containing the polyolefin polymer and to a molded article thereof.

BACKGROUND ART

In recent years, in various industrial fields such as electric and electronic parts, transport equipment, civil engineering and construction, medical, leisure and the like, a curable material is used as a material for sealing, coating, potting, or bonding. As such a curable material, a curable material (composition) containing an organic polymer having a silicone-containing group has been known.

For example, Japanese Patent Laid-Open Publication No. H04-185687 (Patent Document 1) discloses a composition composed of a compound having at least one alkenyl group in the molecule, a hydrosilylation catalyst, and a silane coupling agent.

However, even though the composition disclosed in the Document 1 surely has shorter residence time and improved adhesion properties as compared with conventional compositions, there have been the cases where curing rate, weatherability, and thermal aging resistance are still insufficient. In addition, further improvement in adhesion properties has been desired.

WO 2001/98407 (Patent Document 2) proposes a rubber composition composed of an ethylene-α-olefin-non-conjugated polyene random copolymer and a SiH group-containing compound. This rubber composition shows rapid crosslinking rate at room temperature and in addition the composition is excellent in productivity, weatherability, ozone-resistance, thermal aging resistance, compression set resistance, as well as moldability and adhesion.

However, in spite of excellent adhesion properties, this copolymer rubber could not express mechanical properties, in particular tensile characteristics, in proportion to the molecular weight thereof. Therefore, the rubber could not satisfy tensile characteristics, which usual curable materials intrinsically have.

[Patent Document 1] Japanese Patent Laid-Open Publication No. H04-185687
[Patent Document 2] WO 2001/98407

DISCLOSURE OF THE INVENTION

Problems to be Solved by the Invention

An object of the present invention is to provide a polyolefin polymer containing vinyl groups at both ends thereof that can be molded by a LIM molding, an injection molding, a transfer molding, a compression molding, and the like, and that has excellent acid resistance, gas permeation resistance, hydrolysis resistance, and dynamic fatigue resistance.

Further, another object of the present invention is to provide a thermoplastic resin composition, a crosslinkable resin composition, and a crosslinked composition, which contain the polymer, and which are excellent in mechanical characteristics, and also to provide a molded article and a multilayered laminate produced by using the compositions described above.

Means for Solving the Problems

Accordingly, the inventors of the present invention have investigated extensively in order to solve the problems, and have found a polyolefin polymer containing double bonds at both ends of the molecular chain that can provide a crosslinked composition fully utilizing the molecular weight of the polymer, and having mechanical characteristics in proportion to the molecular weight. Thus the present invention has been achieved.

Specifically, the polyolefin polymer containing vinyl groups at both ends thereof of the present invention, the composition or the crosslinked body which contains the polyolefin polymer, and the molded article or the multilayered laminate, which is produced by using the crosslinked body, are provided by the following [1] to [19].

[1] A polyolefin polymer containing vinyl groups at both ends thereof, containing a constitutional unit derived from at least one selected from the group consisting of ethylene (a), an ex-olefin (b) having 3 to 20 carbon atoms, and a cyclic olefin (c) represented by the following general formulae [I], [II], and [III]; and having (1) a rate of the terminal vinylation of 70% or more to all of both ends of the molecular chains, and (2) an intrinsic viscosity [η] in the range of 0.01 to 10 dl/g as measured in a Decalin® solution at 135° C.

[Formula 1]

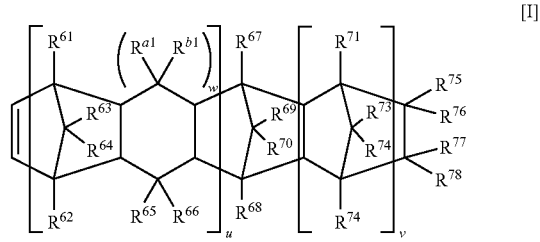

(In the formula [I], u represents 0 or 1; v represents an integer of 0 or 1 or more; w represents 0 or 1; each of $R^{61}$ to $R^{78}$, $R^{a1}$ and $R^{b1}$ may be the same or different and represents a hydrogen atom, a halogen atom, or a hydrocarbon group; each of $R^{75}$ to $R^{78}$ may be bonded to form a single ring or multiple rings and the single ring or the multiple rings thus formed may have a double bond; and an alkylidene group may be formed by $R^{75}$ and $R^{76}$ or by $R^{77}$ and $R^{78}$.)

[Formula 2]

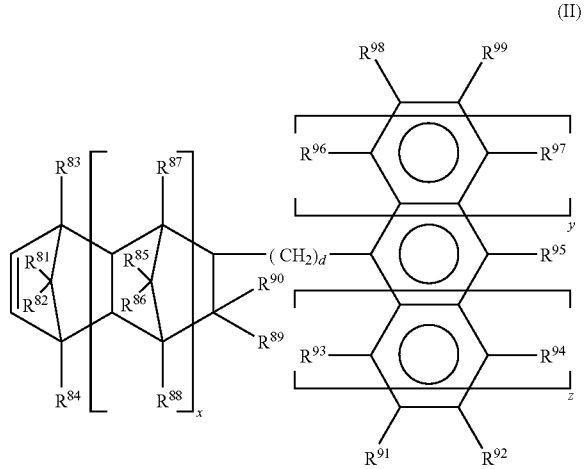
(II)

(In the formula [II], each of x and d represents an integer of 0 or 1 or more; each of y and z represents 0, 1, or 2, each of $R^{81}$ to $R^{99}$ may be the same or different and represents a hydrogen atom, a halogen atom, an aliphatic hydrocarbon group, an aromatic hydrocarbon group, or an alkoxy group; a carbon atom to which $R^{89}$ and $R^{90}$ are bonded may form a bond with a carbon atom to which $R^{93}$ is bonded or a carbon atom to which $R^{91}$ is bonded, directly or via an alkylene group having 1 to 3 carbon atoms; and when y=z=0, $R^{95}$ and $R^{92}$ or $R^{95}$ and $R^{99}$ may be bonded with each other to form an aromatic ring having a single ring or multiple rings.)

[Formula 3]

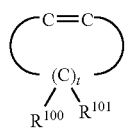
[III]

(In the formula [III], each of $R^{100}$ and $R^{101}$ may be the same or different and represents a hydrogen atom or a hydrocarbon group having 1 to 5 carbon atoms; and f represents an integer of $1 \leq f \leq 18$.

[2] The polyolefin polymer containing vinyl groups at both ends thereof according to the [1], in which the α-olefin (b) is at least one kind of an α-olefin (f) having 4 to 20 carbon atoms.

[3] The polyolefin polymer containing vinyl groups at both ends thereof according to the [1], in which the α-olefin (b) is propylene (e).

[4] The polyolefin polymer containing vinyl groups at both ends thereof according to the [3], in which a constitutional unit derived from the propylene (e) according to the [3] satisfies any one of the following conditions i) to iii):

i) the mesotriad fraction (mm) obtained from $^{13}$C-NMR is 50% or more, ii) the racemotriad fraction (rr) obtained from $^{13}$C-NMR is 50% or more, and iii) the mesotriad fraction obtained from $^{13}$C-NMR is less than 50% and the racemotriad fraction obtained from $^{13}$C-NMR is less than 50%.

[5] The polyolefin polymer containing vinyl groups at both ends thereof according to any one of the [1] to [4], in which a constitutional unit derived from polyene (d) represented by the following general formula [IV] is further contained.

[Formula 4]

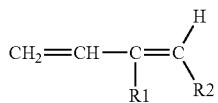
[IV]

(In the formula [IV], each of $R^1$ and $R^2$ may be the same or different and represents a hydrogen atom, and an alkyl group having 1 to 8 carbon atoms or an aryl group, and at least one of $R^1$ and $R^2$ is a hydrogen atom.)

[6] The polyolefin polymer containing vinyl groups at both ends thereof according to any one of the [1] to [4], in which the ratio of the number of moles a of the constitutional unit derived from the ethylene (a) to the total number of moles b of the constitutional unit derived from the α-olefin (b) and moles c of the constitutional unit derived from the cyclic olefin (c), namely a/(b+c), is in the range of 99/1 to 50/50.

[7] The polyolefin polymer containing vinyl groups at both ends thereof according to the [5], in which the ratio of the number of moles a of the constitutional unit derived from the ethylene (a) to the total number of moles b of the constitutional unit derived from the α-olefin (b), moles c of the constitutional unit derived from the cyclic olefin (c), and moles d of the constitutional unit derived from the polyene (d), namely a/(b+c+d), is in the range of 99/1 to 50/50.

[8] The polyolefin polymer containing vinyl groups at both ends thereof according to any one of the [1] to [4], in which constitutional units derived from propylene (e) and an α-olefin (f) having 4 to 20 carbon atoms are contained as the constitutional unit derived from the α-olefin (b), and the ratio of the number of moles e of the constitutional unit derived from the propylene (e) to the total number of moles a of the constitutional unit derived from the ethylene (a), moles f of the constitutional unit derived from the α-olefin (f) having 4 to 20 carbon atoms, and moles c of the constitutional unit derived from the cyclic olefin (c), namely e/(a+f+c), is in the range of 99/1 to 50/50.

[9] The polyolefin polymer containing vinyl groups at both ends thereof according to the [5], wherein constitutional units derived from propylene (e) and an α-olefin (f) having 4 to 20 carbon atoms are contained as the constitutional unit derived from the α-olefin (b), and the ratio of the number of moles e of the constitutional unit derived from the propylene (e) to the total number of moles a of the constitutional unit derived from the ethylene (a), moles f of the constitutional unit derived from the α-olefin (f) having 4 to 20 carbon atoms, moles c of the constitutional unit derived from the cyclic olefin (c), and moles d of the constitutional unit derived from the polyene (d), namely e/(a+f+c+d), is in the range of 99/1 to 50/50.

[10] The polyolefin polymer containing vinyl groups at both ends thereof according to any one of the [1] to [4], in which constitutional units derived from propylene (e) and an α-olefin (f) having 4 to 20 carbon atoms are contained as the constitutional unit derived from the α-olefin (b), and the ratio of the number of moles f of the constitutional unit derived from the α-olefin (f) having 4 to 20 carbon atoms to the total number of moles a of the constitutional unit derived from the ethylene (a), moles e of the constitutional unit derived from the propylene (e), and moles c of the constitutional unit derived from the cyclic olefin (c) namely f/(a+e+c), is in the range of 99/1 to 50/50.

[11] The polyolefin polymer containing vinyl groups at both ends thereof according to the [5], in which constitutional units derived from propylene (e) and an α-olefin (f) having 4 to 20 carbon atoms are contained as the constitutional unit derived from the α-olefin (b), and the ratio of the number of moles f of the constitutional unit derived from the α-olefin (f) having 4 to 20 carbon atoms to the total number of moles a of the constitutional unit derived from the ethylene (a), moles e of the constitutional unit derived from the propylene (e), moles c of the constitutional unit derived from the cyclic olefin (c), and moles d of the constitutional unit derived from the polyene (d), namely f/(a+e+c+d), is in the range of 99/1 to 50/50.

[12] The polyolefin polymer containing vinyl groups at both ends thereof according to any one of the [5] or [7], in which constitutional units derived from the α-olefin (b), the cyclic olefin (c), and the polyene (d) are contained, and the α-olefin (b) is at least one kind selected from the group consisting of propylene, 1-butene, 1-hexene, 1-octene, 1-decene, and 4-methyl-1-pentene, the cyclic olefin (c) is at least one kind selected from the group consisting of the general formulae [I] and [II], and the polyene (d) is at least one kind selected from the group consisting of 5-ethylidene-2-norbornene, 5-vinyl-2-norbornene, dicyclopentadiene, 1,3-butadiene, and isoprene.

[13] The polyolefin polymer containing vinyl groups at both ends thereof according to any one of the [9] or [11], in which constitutional units derived from the propylene (e), the α-olefin (f) having 4 to 20 carbon atoms, the cyclic olefin (c), and the polyene (d) are contained, and the α-olefin (f) is at least one kind selected from the group consisting of 1-butene, 1-hexene, 1-octene, 1-decene, and 4-methyl-1-pentene, the cyclic olefin (c) is at least one kind selected from the group consisting of the general formulae [I] and [II], and the polyene (d) is at least one kind selected from the group consisting of 5-ethylidene-2-norbornene, 5-vinyl-2-norbornene, dicyclopentadiene, 1,3-butadiene, and isoprene.

[14] The polyolefin polymer containing vinyl groups at both ends thereof according to the [12], in which constitutional units derived from the α-olefin (b), the cyclic olefin (c), and the polyene (d) are contained, and the α-olefin (b) is propylene and/or 1-butene, the cyclic olefin (c) is at least one kind selected from the group consisting of the general formulae [I] and [II], and the polyene (d) is 1,3-butadiene.

[15] A thermoplastic resin composition containing the polyolefin polymer containing vinyl groups at both ends thereof according to any one of the [1] to [14] and at least one kind of other thermoplastic resins (A).

[16] A crosslinkable resin composition composed of the polyolefin polymer containing vinyl groups at both ends thereof according to any one of the [1] to [14] or the thermoplastic resin composition according to the [15], and at least one kind selected from the group consisting of sulfur (B-1), a compound (B-2) having at least two hydrosilyl groups in the molecule thereof, and an organic peroxide (B-3).

[17] A crosslinked composition obtained by crosslinking at least part of the composition according to the [16].

[18] A molded article comprising the polyolefin polymer containing vinyl groups at both ends thereof according to any one of the [1] to [14], the thermoplastic resin composition according to the [15], the crosslinkable resin composition according to the [16], or the crosslinked composition according to the [17].

[19] A multilayered laminate having at least one layer comprising:

the polyolefin polymer containing vinyl groups at both ends thereof according to any one of the [1] to [14];

the thermoplastic resin composition according to the [15];

the crosslinkable resin composition according to the [16]; or the crosslinked composition according to the [17].

Effects of the Invention

The present invention provides:

a polyolefin polymer containing vinyl groups at both ends thereof, a thermoplastic resin composition and a crosslinkable resin composition which contain the polyolefin polymer, and a crosslinked composition excellent in mechanical characteristics, all of which may be molded by a LIM molding, an injection molding, a transfer molding, a compression molding, and the like; and further a molded article and a multilayered laminate comprising the crosslinked composition.

In addition, the present invention provides:

a polyolefin polymer containing vinyl groups at both ends thereof satisfying acid resistance, gas permeation resistance, hydrolysis resistance, and the dynamic fatigue resistance, which usual curable materials intrinsically have.

BEST MODE FOR CARRYING OUT THE INVENTION

[Polyolefin Polymer Containing Vinyl Groups at Both Ends Thereof]

The polyolefin polymer containing vinyl groups at both ends thereof of the present invention is a polymer that contains at least one constitutional unit derived from the group consisting of ethylene (a), an α-olefin (b) having 3 to 20 carbon atoms, and a cyclic olefin (c) represented by the general formulae [I], [II], and [III].

[α-Olefin (b) Having 3 to 20 Carbon Atoms]

Specific examples of the α-olefin (b) having 3 to 20 carbon atoms include propylene, 1-butene, 2-butene, 1-pentene, 1-hexene, 4-methyl-1-pentene, 4,4-dimethyl-1-pentene, 3-methyl-1-pentene, 4-methyl-1-hexene, 3-ethyl-1-hexene, 4-ethyl-1-hexene, 4,4-dimethyl-1-hexene, 1-octene, 3-methyl-1-butene, 1-nonene, 1-decene, 1-undecene, 1-dodecene, 1-tetradecene, 1-hexadecene, 1-octadecene, 1-eicocene, and the like.

The α-olefin (b) is preferably an α-olefin having 3 to 10 carbon atoms, and particularly preferably propylene, 1-butene, 1-pentene, 1-hexene, 4-methyl-1-pentene, 1-octene, or 1-decene.

These α-olefins (b) may be used alone or in combination of two or more kinds.

When the α-olefin (b) is used in combination of two or more kinds, it is particularly preferable that one of them is propylene (e) and the other α-olefin (b) is at least one kind of α-olefins (f) having 4 to 20 carbon atoms.

[Cyclic Olefin]

The cyclic olefin (c) is at least one kind of cyclic olefin selected from the group consisting of the cyclic olefins represented by the general formulae [I], [II], and [III].

Cyclic Olefin Represented by the General Formula [I]

Firstly, the cyclic olefin represented by the following general formula [I] is explained.

[Formula 5]

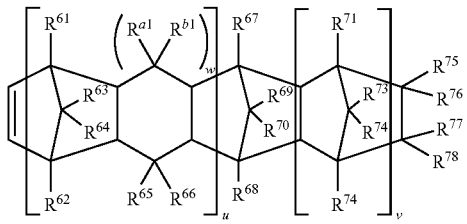

[I]

In the formula [I], u represents 0 or 1; v represents an integer of 0 or 1 or more; w represents 0 or 1; each of $R^{61}$ to $R^{78}$, $R^{a1}$, and $R^{b1}$ represents a hydrogen atom, a halogen atom, or a hydrocarbon group and may be the same or different.

The halogen atom may be exemplified by a fluorine atom, a chlorine atom, a bromine atom, an iodine atom, and the like.

The hydrocarbon group may be exemplified by an alkyl group having 1 to 20 carbon atoms, a halogenated alkyl group having 1 to 20 carbon atoms, a cycloalkyl group having 3 to 15 carbon atoms, an aromatic hydrocarbon group, and an aliphatic unsaturated hydrocarbon group having one or more double bonds.

The alkyl group may be exemplified by a methyl group, an ethyl group, a propyl group, an isopropyl group, an amyl group, a hexyl group, an octyl group, a decyl group, a dodecyl group, an octadecyl group, and the like. The halogenated alkyl group may be exemplified by a group in which at least one hydrogen atom of the alkyl group mentioned above is substituted by a halogen atom. The cycloalkyl group may be exemplified by a cyclohexyl group and the like. The aromatic hydrocarbon group may be exemplified by a phenyl group, a naphthyl group, and the like. The aliphatic unsaturated hydrocarbon group may be exemplified by a vinyl group, an allyl group, and the like.

In the general formula [I], $R^{75}$ and $R^{76}$, $R^{77}$ and $R^{78}$, $R^{75}$ and $R^{77}$, $R^{76}$ and $R^{78}$, $R^{75}$ and $R^{78}$, or $R^{76}$ and $R^{77}$ may be bonded with each other (cooperate with each other) to form a single ring or multiple rings. The single ring or the multiple rings thus formed may have a double bond.

The single ring or the multiple rings may be exemplified by the following.

[Formula 6]

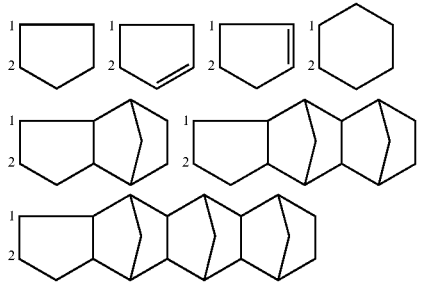

In the examples above, the carbon atom tagged by number 1 or 2 shows respectively the carbon atom bonding to $R^{75}$ ($R^{76}$) or $R^{77}$ ($R^{78}$) in the general formula [I]. Among these compounds represented by the general formula [I], the multiple rings are preferable in view of the heat resistance since the multiple rings give a copolymer having higher Tg with a smaller content of the compound, as compared with the single ring. Furthermore, the multiple rings have an advantage of producing the copolymer by charging a small amount of the cyclic olefin.

Further, an alkylidene group may be formed by $R^{75}$ and $R^{76}$, or by $R^{77}$ and $R^{78}$.

The alkylidene group is usually an alkylidene group having 1 to 20 carbon atoms. The alkylidene group may be exemplified by a methylene group ($CH_2=$), an ethylidene group ($CH_3CH=$), a propylidene group ($CH_3CH_2CH=$), an isopropylidene group (($CH_3)_2C=$), and the like.

The cyclic olefin represented by the general formula [I] may be exemplified by a cyclic olefin represented by the following general formula [V].

[Formula 7]

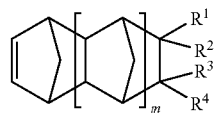

[V]

In the formula [V], m represents an integer of 0 to 2, and each of $R^1$ to $R^4$ may be the same or different and represents an atom or a group selected from the group consisting of a hydrogen atom, a halogen atom, and a hydrocarbon group.

The halogen atom may be exemplified by a fluorine atom, a chlorine atom, a bromine atom, an iodine atom, and the like.

The hydrocarbon group may be exemplified by an alkyl group having 1 to 20 carbon atoms, a halogenated alkyl group having 1 to 20 carbon atoms, a cycloalkyl group having 3 to 15 carbon atoms, an aromatic hydrocarbon group having 6 to 20 carbon atoms, an aliphatic unsaturated hydrocarbon group having one or more double bonds, and the like.

The alkyl group may be exemplified by a methyl group, an ethyl group, a propyl group, an isopropyl group, an amyl group, a hexyl group, an octyl group, a decyl group, a dodecyl group, an octadecyl group, and the like. The halogenated alkyl group may be exemplified by a group in which at least one hydrogen atom of the alkyl group mentioned above is substituted by a halogen atom such as a fluorine atom, a chlorine atom, a bromine atom, an iodine atom, and the like. The cycloalkyl group may be exemplified by a cyclohexyl group and the like. The aromatic hydrocarbon group may be exemplified by a phenyl group, a naphthyl group, and the like. The unsaturated hydrocarbon group may be exemplified by a vinyl group, an allyl group, and the like.

Among $R^1$ to $R^4$, an arbitrary pair may be bonded with each other (cooperate with each other) to form a group having a single ring or multiple rings. The arbitrary pair of $R^1$ to $R^4$ is $R^1$ and $R^2$, $R^3$ and $R^4$, $R^1$ and $R^3$, $R^2$ and $R^4$, $R^1$ and $R^4$, or $R^2$ and $R^3$. Further, the single ring or the multiple rings thus formed may have the double bond.

Further, an alkylidene group may be formed by $R^1$ and $R^2$, or by $R^3$ and $R^4$ in the formula [V].

The alkylidene group is usually an alkylidene group having 1 to 20 carbon atoms. The alkylidene group may be exemplified by a methylene group ($CH_2=$), an ethylidene group ($CH_3CH=$), a propylidene group ($CH_3CH_2CH=$), an isopropylidene group (($CH_3)_2C=$), and the like.

It is preferable that the cyclic olefin represented by the formula [V] satisfies any of the following (i) to (iv).

(i) A single ring or multiple rings formed by bonding $R^1$ to $R^4$ with each other contain a double bond.

(ii) $R^1$ and $R^2$, or $R^3$ and $R^4$ form an alkylidene group.

(iii) $R^1$ and $R^3$, or $R^2$ and $R^4$ are bonded with each other to form a double bond.

(iv) At least one of $R^1$ to $R^4$ is an aliphatic unsaturated hydrocarbon group containing one or more double bonds.

The above (i) to (iv) may be exemplified by the followings and the like.

(A) An alkylidene group-containing cyclic olefin (c-1) represented by the formula [VI] in which $R^1$ and $R^2$, or $R^3$ and $R^4$ form the alkylidene group.

(B) A polycyclic olefin (c-2) in which an arbitrary pair of $R^1$ to $R^4$ is bonded with each other to form a single ring or multiple rings having one or more double bonds.

(C) A cyclic olefin containing an unsaturated hydrocarbon group (c-3) in which at least one of $R^1$ to $R^4$ is a monovalent unsaturated hydrocarbon group containing one or more double bonds.

(D) A ring-symmetrical cyclic olefin (c-4) in which $R^1$ and $R^3$, or $R^2$ and $R^4$ are bonded with each other to form a double bond, and the ring has a symmetry when the line connecting bridge-head carbon atoms with each other or connecting common carbon atoms with each other of the condensed ring is a symmetry axis.

[Formula 8]

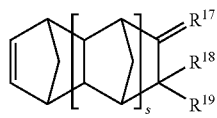

[VI]

In the formula [VI], s represents an integer of 0 to 2; $R^{17}$ represents an alkylidene group; each of $R^{18}$ and $R^{19}$ may be the same or different and represents an atom or a group selected from the group consisting of a hydrogen atom, a halogen atom, and a hydrocarbon group; and $R^{18}$ and $R^{19}$ may form an alkylidene group.

The alkylidene group may be exemplified by an alkylidene group having 1 to 20 carbon atoms such as a methylene group, an ethylidene group, a propylidene group, an isopropylidene group, and the like. The halogen atom may be exemplified by a fluorine atom, a chlorine atom, a bromine atom, an iodine atom, and the like.

The hydrocarbon group may be exemplified by an alkyl group having 1 to 20 carbon atoms, a halogenated alkyl group having 1 to 20 carbon atoms, a cycloalkyl group having 3 to 15 carbon atoms, an aromatic hydrocarbon group having 6 to 20 carbon atoms, and the like.

Specific examples of the alkylidene group-containing cyclic olefin (c-1) represented by the formula [VI] include 5-methylene-2-norbornene, 5-ethylidene-2-norbornene (ENB), 5-isopropylidene-2-norbornene, compounds shown below, and the like. Among them, 5-ethylidene-2-norbornene is preferable.

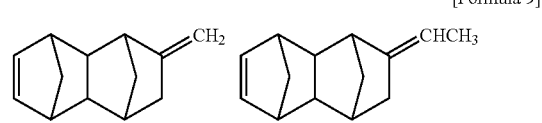

[Formula 9]

Specific, examples of the polycyclic olefin (c-2) include dicyclopentadiene (DCPD), dimethylcyclopentadiene, and compounds shown below.

[Formula 10]

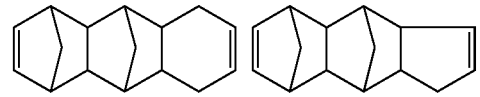

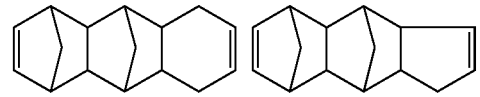

Specific examples of the cyclic olefin containing an unsaturated hydrocarbon group (c-3) include 5-vinyl-2-norbornene (VNB), compounds shown below, and the like.

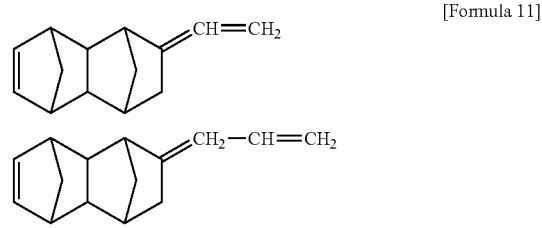

[Formula 11]

Specific examples of the ring-symmetrical cyclic olefin (c-4) include the compounds shown below.

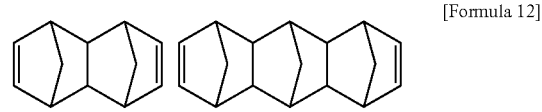

[Formula 12]

Among the cyclic olefins represented by the formula [V], the alkylidene group-containing polyene represented by the formula [VI] and the cyclic olefin containing an unsaturated hydrocarbon group shown by (c-3) are preferable, and 5-vinyl-2-norbornene (VNB) is more preferable.

[Cyclic Olefin Represented by the General Formula [II]]

In the following, the cyclic olefin represented by the general formula [II] is explained.

[Formula 13]

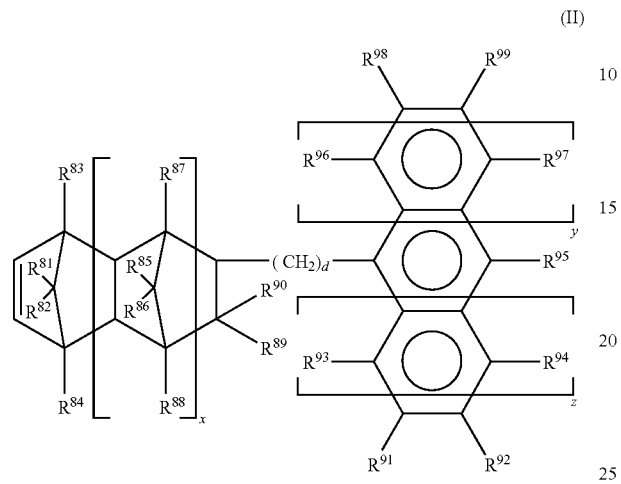

(II)

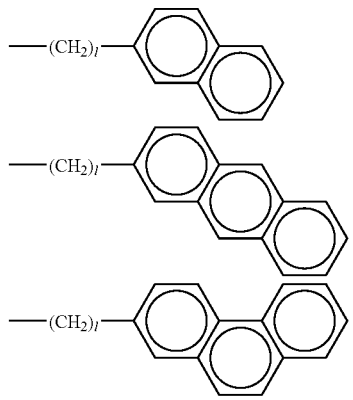

[Formula 14]

[Cyclic Olefin Represented by the General Formula [III]]

The cyclic olefin represented by the following formula [III] is explained.

[Formula 15]

[III]

In the formula [II], each of x and d represents an integer of 0 or 1 or more; each of y and z represents 0, 1, or 2; each of $R^{81}$ to $R^{99}$ represents a hydrogen atom, a halogen atom, an aliphatic hydrocarbon group, an aromatic hydrocarbon group, or an alkoxy group and may be the same or different.

The halogen atom may be exemplified by a fluorine atom, a chlorine atom, a bromine atom, an iodine atom, and the like.

The aliphatic hydrocarbon group may be exemplified by an alkyl group having 1 to 20 carbon atoms or a cycloalkyl group having 3 to 15 carbon atoms. The alkyl group may be exemplified by a methyl group, an ethyl group, a propyl group, an isopropyl group, an amyl group, a hexyl group, an octyl group, a decyl group, a dodecyl group, an octadecyl group, and the like. The cycloalkyl group may be exemplified by a cyclohexyl group and the like.

The aromatic hydrocarbon group may be exemplified by an aryl group, an aralkyl group, and the like. The aryl group may be exemplified by a phenyl group, a tolyl group, a naphthyl group, a benzyl group, and the like. The aralkyl group may be exemplified by a phenylethyl group and the like.

The alkoxy group may be exemplified by a methoxy group, an ethoxy group, a propoxy group, and the like.

Here, the carbon atom to which $R^{89}$ and $R^{90}$ are bonded may form a bond with the carbon atom to which $R^{93}$ is bonded or with the carbon atom to which $R^{91}$ is bonded, directly or via an alkylene group having 1 to 3 carbon atoms. Namely, when the two carbons mentioned above form a bond via an alkylene group, $R^{89}$ and $R^{93}$, or $R^{90}$ and $R^{91}$ cooperate with each other to form any one of an alkylene group in a methylene group (—CH$_2$—), an ethylene group (—CH$_2$CH$_2$—), or a propylene group (—CH$_2$CH$_2$CH$_2$—).

Further, when y=z=0, $R^{95}$ and $R^{92}$, or $R^{95}$ and $R^{99}$ may be bonded with each other to form a monocyclic or a polycyclic aromatic ring. As such examples, the following aromatic rings formed by $R^{95}$ and $R^{92}$ may be mentioned. In the groups shown below, l is the same as d in the formula [II] and represents an integer of 0 or 1 or more.

In the formula [III], f represents an integer satisfying $1 \leq f \leq 18$, and each of $R^{100}$ and $R^{101}$ represents a hydrogen atom or a hydrocarbon group having 1 to 5 carbon atoms and may be the same or different.

The hydrocarbon group is preferably an alkyl group having 1 to 5 carbon atoms, a halogenated alkyl group having 1 to 5 carbon atoms, and a cycloalkyl group having 1 to 5 carbon atoms.

The alkyl group may be exemplified by a methyl group, an ethyl group, a propyl group, an isopropyl group, an amyl group, and the like. The halogenated alkyl group may be exemplified by a group in which at least one hydrogen atom of the alkyl group mentioned above is substituted by a halogen atom.

The cyclic olefin represented by the formula [I] may be exemplified by a tricyclo-3-decene derivative, a tricyclo-3-undecene derivative, a tetracyclo-3-dodecene derivative, a pentacyclo-4-pentadecene derivative, a pentacyclopentadecadiene derivative, a pentacyclo-3-pentadecene derivative, a pentacyclo-4-hexadecene derivative, a pentacyclo-3-hexadecene derivative, a hexacyclo-4-heptadecene derivative, a heptacyclo-5-eicosene derivative, a heptacyclo-4-eicosene derivative, a heptacyclo-5-heneicosene derivative, an octacyclo-5-dococene derivative, a nonacyclo-5-pentacocene derivative, a nonacyclo-6-hexacocene derivative, and the like. The cyclic olefin represented by the formula [II] may be exemplified by a cyclopentadiene-acenaphthylene adduct, a 1,4-methano-1,4,4a,9a-tetrahydrofluorene derivative, and a 1,4-methano-1,4,4a,5,10,10a-hexahydroanthracene derivative, and the like. The cyclic olefin represented by the formula [III] may be exemplified by a cycloalkylene derivative having 3 to 20 carbon atoms and the like.

Specific examples of the compound represented by the formula [I] include a tricyclo-3-decene derivative such as tricyclo[4.3.0.1$^{2.5}$]-3-decene, 2-methyltricyclo[4.3.0.1$^{2.5}$]-3- decene and the like; a tricyclo-3-undecene derivative such as tricyclo[4.4.0.1$^{2,5}$]-3-undecene, 7-methyltricyclo[4.4.0.1$^{2,5}$]-3-undecene and the like;

a tetracyclo[4.4.0.1$^{2,5}$.1$^{7,10}$]-3-dodecene derivative such as tetracyclo[4.4.0.1$^{2,5}$.1$^{7,10}$]-3-dodecene, 8-methyltetracyclo[4.4.0.1$^{2,5}$.1$^{7,10}$]-3-dodecene, 8-ethyltetracyclo[4.4.0.1$^{2,5}$.1$^{7,10}$]-3-dodecene, 8-propyltetracyclo[4.4.0.1$^{2,5}$.1$^{7,10}$]-3-dodecene, 8-butyltetracyclo[4.4.0.1$^{2,5}$.1$^{7,10}$]-3-dodecene, 8-isobutyltetracyclo[4.4.0.1$^{2,5}$.1$^{7,10}$]-3-dodecene, 8-hexyltetracyclo[4.4.0.1$^{2,5}$.1$^{7,10}$]-3-dodecene, 8-cyclohexyltetracyclo[4.4.0.1$^{2,5}$.1$^{7,10}$]-3-dodecene, 8-stearyltetracyclo[4.4.0.1$^{2,5}$.1$^{7,10}$]-3-dodecene, 5,10-dimethyltetracyclo[4.4.0.1$^{2,5}$.1$^{7,10}$]-3-dodecene, 2,10-dimethyltetracyclo[4.4.0.1$^{2,5}$.1$^{7,10}$]-3-dodecene, 8,9-dimethyltetracyclo[4.4.0.1$^{2,5}$.1$^{7,10}$]-3-dodecene, 8-ethyl-9-methyltetracyclo[4.4.0.1$^{2,5}$.1$^{7,10}$]-3-dodecene, 11,12-dimethyltetracyclo[4.4.0.1$^{2,5}$.1$^{7,10}$]-3-dodecene, 2,7,9-trimethyltetracyclo[4.4.0.1$^{2,5}$.1$^{7,10}$]-3-dodecene, 2,7-dimethyl-9-ethyltetracyclo[4.4.0.1$^{2,5}$.1$^{7,10}$]-3-dodecene, 9-isobutyl-2,7-dimethyltetracyclo[4.4.0.1$^{2,5}$.1$^{7,10}$]-3-dodecene, 8,11,12-trimethyltetracyclo[4.4.0.1$^{2,5}$.1$^{7,10}$]-3-dodecene, 8-ethyl-11,12-dimethyltetracyclo[4.4.0.1$^{2,5}$.1$^{7,10}$]-3-dodecene, 8-isobutyl-11,12-dimethyltetracyclo[4.4.0.1$^{2,5}$.1$^{7,10}$]-3-dodecene, 2,7,8,9-tetramethyltetracyclo[4.4.0.1$^{2,5}$.1$^{7,10}$]-3-dodecene, 8-ethylidenetetracyclo[4.4.0.1$^{2,5}$.1$^{7,10}$]-3-dodecene, 8-ethylidene-9-methyltetracyclo[4.4.0.1$^{2,5}$.1$^{7,10}$]-3-dodecene, 8-ethylidene-9-isopropyltetracyclo[4.4.0.1$^{2,5}$.1$^{7,10}$]-3-dodecene, 8-ethylidene-9-butyltetracyclo[4.4.0.1$^{2,5}$.1$^{7,10}$]-3-dodecene, 8-n-propylidenetetracyclo[4.4.0.1$^{2,5}$.1$^{7,10}$]-3-dodecene, 8-n-propylidene-9-methyltetracyclo[4.4.0.1$^{2,5}$.1$^{7,10}$]-3-dodecene, 8-n-propylidene-9-ethyltetracyclo[4.4.0.1$^{2,5}$.1$^{7,10}$]-3-dodecene, 8-n-propylidene-9-isopropyltetracyclo[4.4.0.1$^{2,5}$.1$^{7,10}$]-3-dodecene, 8-n-propylidene-9-butyltetracyclo[4.4.0.1$^{2,5}$.1$^{7,10}$]-3-dodecene, 8-isopropylidenetetracyclo[4.4.0.1$^{2,5}$.1$^{7,10}$]-3-dodecene, 8-isopropylidene-9-methyltetracyclo[4.4.0.1$^{2,5}$.1$^{7,10}$]-3-dodecene, 8-isopropylidene-9-ethyltetracyclo[4.4.0.1$^{2,5}$.1$^{7,10}$]-3-dodecene, 8-isopropylidene-9-isopropyltetracyclo[4.4.0.1$^{2,5}$.1$^{7,10}$]-3-dodecene, 8-isopropylidene-9-butyltetracyclo[4.4.0.1$^{2,5}$.1$^{7,10}$]-3-dodecene, 8-chlorotetracyclo[4.4.0.1$^{2,5}$.1$^{7,10}$]-3-dodecene, 8-bromotetracyclo[4.4.0.1$^{2,5}$.1$^{7,10}$]-3-dodecene, 8-fluorotetracyclo[4.4.0.1$^{2,5}$.1$^{7,10}$]-3-dodecene, 8,9-dichlorotetracyclo[4.4.0.1$^{2,5}$.1$^{7,10}$]-3-dodecene, and the like, a pentacyclo[6.5.1.1$^{3,6}$.0$^{2,7}$.0$^{9,13}$]-4-pentadecene derivative such as pentacyclo[6.5.1.1$^{3,6}$.0$^{2,7}$.0$^{9,13}$]-4-pentadecene, 1,3-dimethylpentacyclo[6.5.1.1$^{3,6}$.0$^{2,7}$.0$^{9,13}$]-4-pentadecene, 1,6-dimethylpentacyclo[6.5.1.1$^{3,6}$.0$^{2,7}$.0$^{9,13}$]-4-pentadecene, 14,15-dimethylpentacyclo[6.5.1.1$^{3,6}$.0$^{2,7}$.0$^{9,13}$]-4-pentadecene, and the like; a pentacyclo[6.5.1.1$^{3,6}$.0$^{2,7}$.0$^{8,13}$]-3-pentadecene derivative such as pentacyclo[6.5.1.1$^{3,6}$.0$^{2,7}$.0$^{8,13}$]-3-pentadecene, a methyl-substituted pentacyclo[7.4.0.1$^{2,5}$.1$^{9,12}$.0$^{8,13}$]-3-pentadecene, and the like; pentacyclodecadiene compounds such as pentacyclo[6.5.1.1$^{3,6}$.0$^{2,7}$.0$^{9,13}$]-4,10-pentadecadiene and the like;

a pentacyclo[8.4.0.1$^{2,5}$.1$^{9,12}$.0$^{8,13}$]-3-hexadecene derivative such as pentacyclo[8.4.0.1$^{2,5}$.1$^{9,12}$.0$^{8,13}$]-3-hexadecene, 10-methyl-pentacyclo[8.4.0.1$^{2,5}$.1$^{9,12}$.0$^{8,13}$]-3-hexadecene, 10-ethyl-pentacyclo[8.4.0.1$^{2,5}$.1$^{9,12}$.0$^{8,13}$]-3-hexadecene, 10,11-dimethyl-pentacyclo[8.4.0.1$^{2,5}$.1$^{9,12}$.0$^{8,13}$]-3-hexadecene, and the like; a pentacyclo[6.6.1.1$^{3,6}$.0$^{2,7}$.0$^{9,13}$]-4-hexadecene derivative such as pentacyclo[6.6.1.1$^{3,6}$.0$^{2,7}$.0$^{9,13}$]-4-hexadecene, 1,3-dimethylpentacyclo[6.6.1.1$^{3,6}$.0$^{2,7}$.0$^{9,13}$]-4-hexadecene, 1,6-dimethylpentacyclo[6.6.1.1$^{3,6}$.0$^{2,7}$.0$^{9,13}$]-4-hexadecene, 15,16-dimethylpentacyclo[6.6.1.1$^{3,6}$.0$^{2,7}$.0$^{9,13}$]-4-hexadecene, and the like;

a hexacyclo[6.6.1.1$^{3,6}$.1$^{10,13}$.0$^{2,7}$.0$^{9,14}$]-4-heptadecene derivative such as hexacyclo[6.6.1.1$^{3,6}$.1$^{10,13}$.0$^{2,7}$.0$^{9,14}$]-4-heptadecene, 11-methylhexacyclo[6.6.1.1$^{3,6}$.1$^{10,13}$.0$^{2,7}$.0$^{9,14}$]-4-heptadecene, 11-ethylhexacyclo[6.6.1.1$^{3,6}$.1$^{10,13}$.0$^{2,7}$.0$^{9,14}$]-4-heptadecene, 11-isobutyl-hexacyclo[6.6.1.1$^{3,6}$.1$^{10,13}$.0$^{2,7}$.0$^{9,14}$]-4-heptadecene, 1,6,10-trimethyl-12-isobutylhexacyclo[6.6.1.1$^{3,6}$.1$^{10,13}$.0$^{2,7}$.0$^{9,14}$]-4-heptadecene, and the like; a heptacyclo-5-eicocene derivative such as heptacyclo[8.7.0.1$^{2,9}$.1$^{4,7}$.1$^{11,17}$.0$^{3,8}$.0$^{12,16}$]-5-eicocene and the like; a heptacyclo[8.7.0.1$^{3,6}$.1$^{10,17}$.1$^{12,15}$.0$^{2,7}$.0$^{11,16}$]-4-eicocene derivative such as heptacyclo[8.7.0.1$^{3,6}$.1$^{10,17}$.1$^{12,15}$.0$^{2,7}$.0$^{11,16}$]-4-eicocene, a dimethyl-substituted heptacyclo[8.7.0.1$^{3,6}$.1$^{10,17}$.1$^{12,15}$.0$^{2,7}$.0$^{11,16}$]-4-eicocene, and the like; a heptacyclo-5-eicocene derivative such as heptacyclo[8.8.0.1$^{2,9}$.1$^{10,17}$.0$^{3,8}$.0$^{12,17}$]-5-eicocene, heptacyclo[8.8.0.1$^{4,7}$.1$^{11,18}$.0$^{3,8}$.0$^{12,17}$]-5-eicocene, 14-methyl-heptacyclo[8.8.0.1$^{4,7}$.1$^{11,18}$.0$^{3,8}$.0$^{12,17}$]-5-eicocene, a trimethyl-substituted heptacyclo[8.8.0.1$^{4,7}$.1$^{11,18}$.0$^{3,8}$.0$^{12,17}$]-5-eicocene, and the like; an octacyclo[8.8.0.1$^{2,9}$.1$^{4,7}$.1$^{11,18}$.0$^{3,8}$.0$^{12,17}$]-5-dococene derivative such as octacyclo[8.8.0.1$^{2,9}$.1$^{4,7}$.1$^{11,18}$.0$^{3,8}$.0$^{12,17}$]-5-dococene, 14-methyloctacyclo[8.8.0.1$^{2,9}$.1$^{4,7}$.1$^{11,18}$.0$^{3,8}$.0$^{12,17}$]-5-dococene, 14-ethyloctacyclo[8.8.0.1$^{2,9}$.1$^{4,7}$.1$^{11,18}$.0$^{3,8}$.0$^{12,17}$]-5-dococene, and the like; a nonacyclo[10.9.1.1$^{4,7}$.1$^{13,20}$.1$^{15,18}$.0$^{2,10}$.0$^{12,21}$.0$^{14,19}$]-5-pentacocene derivative such as nonacyclo[10.9.1.1$^{4,7}$.1$^{13,20}$.1$^{15,18}$.0$^{2,10}$.0$^{12,21}$.0$^{14,19}$]-5-pentacocene, a trimethyl-substituted nonacyclo[10.9.1.1$^{4,7}$.1$^{13,20}$.1$^{15,18}$.0$^{2,10}$.0$^{12,21}$.0$^{14,19}$]-5-pentacocene, and the like; a nonacyclo[10.10.1.1$^{5,8}$.1$^{14,21}$.1$^{16,19}$.0$^{2,11}$.0$^{4,9}$.0$^{13,22}$.0$^{15,20}$]-6-hexacocene derivative such as nonacyclo[10.10.1.1$^{5,8}$.1$^{14,21}$.1$^{16,19}$.0$^{2,11}$.0$^{4,9}$.0$^{13,22}$.0$^{15,20}$]-6-hexacocene and the like.

Specific examples of the compound represented by the above-mentioned formula [II] include a cyclopentadiene-acenaphthylene adduct, 14-methano-1,4,4a,9a-tetrahydrofluorene, 1,4-methano-1,4,4a,5,10,10a-hexahydroanthracene, 8-phenyl-tetracyclo[4.4.0.1$^{2,5}$.1$^{7,10}$]-3-dodecene, 8-methyl-8-phenyl-tetracyclo[4.4.0.1$^{2,5}$.1$^{7,10}$]-3-dodecene, 8-benzyl-tetracyclo[4.4.0.1$^{2,5}$.1$^{7,10}$]-3-dodecene, 8-tolyl-tetracyclo[4.4.0.1$^{2,5}$.1$^{7,10}$]-3-dodecene, 8-ethylphenyl-tetracyclo[4.4.0.1$^{2,5}$.1$^{7,10}$]-3-dodecene, 8-isopropylphenyl-tetracyclo[4.4.0.1$^{2,5}$.1$^{7,10}$]-3-dodecene, 8,9-diphenyl-tetracyclo[4.4.0.1$^{2,5}$.1$^{7,10}$]-3-dodecene, 8-biphenyl-tetracyclo[4.4.0.1$^{2,5}$.1$^{7,10}$]-3-dodecene, 8-(β-naphthyl)-tetracyclo[4.4.0.1$^{2,5}$.1$^{7,10}$]-3-dodecene, 8-(α-naphthyl)-tetracyclo[4.4.0.1$^{2,5}$.1$^{7,10}$]-3-dodecene, 8-anthracenyl-tetracyclo[4.4.0.1$^{2,5}$.1$^{7,10}$]-3-dodecene, a compound of cyclopentadiene-acenaphthylene adduct further adducted with cyclopentadiene, 11,12-benzo-pentacyclo[6.5.1.1$^{3,5}$.0$^{2,7}$.0$^{9,13}$]-4-pentadecene, 11,12-benzo-pentacyclo[6.6.1.1$^{3,6}$.0$^{2,7}$.0$^{9,14}$]-4-hexadecene, 11-phenyl-hexacyclo[6.6.1.1$^{3,5}$.1$^{10,13}$.0$^{2,7}$.0$^{9,14}$]-4-heptadecene, 14,15-benzo-heptacyclo[8.7.0.1$^{2,9}$.1$^{4,7}$.1$^{11,17}$.0$^{3,8}$.0$^{12,16}$]-5-eicocene, and the like.

Specific examples of the compound represented by the formula [III] include cyclopropene, cyclobutene, cyclopentene, cyclohexene, cycloheptene, cyclooctene, cyclodecene, cyclododecene, cycloeicosene, and the like.

Among these cyclic olefins, norbornene, 5-ethyl-2-norbornene, 5-vinyl-2-norbornene, a tetracyclo[4.4.0.1$^{2,5}$.1$^{7,10}$]-3-dodecene derivative, and a hexacyclo[6.6.1.1$^{3,6}$.1$^{10,13}$.0$^{2,7}$.0$^{9,14}$]-4-heptadecene derivative are preferable; and norbornene and tetracyclo[4.4.0.1$^{2,5}$.1$^{7,10}$]-3-dodecene (hereinafter abbreviated as TD) are more preferable.

These cyclic olefins may be used alone or in combination of two or more kinds. When two or more kinds of the cyclic olefins are used in combination, there may be used a combination of two or more kinds of the cyclic olefins represented by the same formula, or a combination of two or more kinds of the cyclic olefins represented by plural formulae, in the group consisting of the cyclic olefins represented by the formulae [I], [II], and [III].

The cyclic olefins represented by the formulae [I], [II], and [III] may be produced by a publicly known method. For example, a compound represented by [I] or [II] may be produced by a Diels-Alder reaction of cyclopentadiene with an olefin having a structure corresponding to the rest of the desired compound.

[Polyene]

The polyolefin polymer containing vinyl groups at both ends thereof of the present invention may further contain a constitutional unit derived from the polyene (d) represented by the following general formula [IV].

[Formula 16]

[IV]

In the formula [IV], R$^1$ and R$^2$ may be the same or different from each other and represent a hydrogen atom, and an alkyl group having 1 to 8 carbon atoms or an aryl group, and at least one of R$^1$ and R$^2$ is a hydrogen atom.

The polyene represented by the formula [IV] may be exemplified by 1,3-butadiene, 1,3-pentadiene, 1,3-hexadiene, 1,3-heptadiene, 1,3-octadiene, 1-phenyl-1,3-butadiene, 1-phenyl-2,4-pentadiene, isoprene, 2-ethyl-1,3-butadiene, 2-propyl-1,3-butadiene, 2-butyl-1,3-butadiene, 2-pentyl-1,3-butadiene, 2-hexyl-1,3-butadiene, 2-heptyl-1,3-butadiene, 2-octyl-1,3-butadiene, 2-phenyl-1,3-butadiene, and the like.

Among them, in view of excellent copolymerization characteristics, 1,3-butadiene and isoprene are particularly preferable.

These polyenes (d) may be used alone or in combination of two or more kinds.

Further, the polyolefin polymer containing vinyl groups at both ends thereof of the present invention may contain a constitutional unit derived from a monomer other than the ethylene (a), α-olefin (b), cyclic olefin (c), and polyene (d) described above. These other monomers may be exemplified by an aromatic vinyl compound, a non-conjugated diene, an unsaturated carboxylate ester, a vinyl ester, and the like.

Among these monomers, an aromatic vinyl compound is preferable from the viewpoints of compatibility of the obtained copolymer with other resin and ease of production of the copolymer with the α-olefin (b) and the polyene (d).

The aromatic vinyl compound may be exemplified by styrene; alkylstyrenes such as o-methylstyrene, m-methylstyrene, p-methylstyrene, o,p-dimethylstyrene, o-ethylstyrene, m-ethylstyrene, p-ethylstyrene, and the like; a functional group-containing styrene derivative such as methoxystyrene, ethoxystyrene, vinylbenzoic acid, methyl vinylbenzoate, vinylbenzyl acetate, hydroxystyrene, o-chlorostyrene, p-chlorostyrene, divinylbenzene, and the like; 3-phenylpropylene, 4-phenylbutene, α-methylstyrene, and others. Among them, styrene and 4-methoxystyrene are preferable.

[Suitable Combination of the Monomers]

The polyolefin polymer containing vinyl groups at both ends thereof of the present invention is a polymer obtained by polymerizing or copolymerizing any of the ethylene (a), α-olefin (b) having 3 to 20 carbon atoms, cyclic olefin (c), and polyene (d) described above.

Suitable monomers of each (a), (b), (c), and (d) are those mentioned above, while suitable combinations of the monomers (a), (b), (c), and (d) are as follows.

A combination of at least one kind of the monomer selected from the ethylene (a), α-olefin (f) having 4 to 20 carbon atoms, and cyclic olefin (c) described above.

A combination of at least one kind of the monomer selected from the ethylene (a), propylene (e), and cyclic olefin (c) described above.

Furthermore, other preferable combinations are as follows.
(1) A combination of at least one kind of α-olefin (b) selected from propylene, 1-butene, 1-hexene, 1-octene, 1-decene, and 4-methyl-1-pentene, at least one kind of cyclic olefin (c) selected from the monomers represented by the general formulae [I] and [II] such as 5-ethylidene-2-norbornene, 5-vinylidene-2-norbornene, 5-vinyl-2-norbornene, and the like, and at least one kind of polyene (d) selected from 1,3-butadiene and isoprene.
(2) In the case that the α-olefin (b) is the α-olefin (f) having 4 to 20 carbon atoms, a combination of at least one kind of α-olefin having 4 to 20 carbon atoms selected from 1-butene, 1-hexene, 1-octene, 1-decene, and 4-methyl-1-pentene, a cyclic olefin (c) selected from the monomers having a norbornene structure such as 5-ethylidene-2-norbornene, 5-vinylidene-2-norbornene, 5-vinyl-2-norbornene, and the like, and at least one kind of polyene (d) selected from 1,3-butadiene and isoprene.
(3) A combination of at least one kind of α-olefin (b) selected from propylene and 1-butene, at least one kind of cyclic olefin (c) selected from the monomers represented by the general formulae [I] and [II], and 1,3-butadiene [polyene (d)].
(4) A combination of ethylene (a), at least one kind of α-olefin (b) selected from propylene, 1-butene, 1-hexene, 1-octene, 1-decene, and 4-methyl-1-pentene, and the polyene (d).
(5) A combination of ethylene (a), the cyclic olefin (c) selected from the monomers represented by the general formulae [I] and [II] such as derivatives of 5-ethylidene-2-norbornene, 5-vinylidene-2-norbornene, 5-vinyl-2-norbornene, tetracyclo[4.4.0.1$^{2,5}$.1$^{7,10}$]-3-dodecene, hexacyclo[6.6.1.1$^{3,6}$.1$^{10,13}$.0$^{2,7}$.0$^{9,14}$]-4-heptadecene, and the like, and the polyene (d).
(6) A combination of propylene (e) and the polyene (d).

[Characteristics of the Polymers (1): The Ratio of the Terminal Vinylation]

The polyolefin polymer containing vinyl groups at both ends thereof of the present invention has a ratio of the terminal vinylation of 70% or more relative to all of both ends of the molecular chains (hereinafter abbreviated simply as the terminal vinylation ratio). When the terminal vinylation ratio is less than 70%, the crosslink is insufficient due to a lack of the crosslinking sites at the time of crosslinking, and there is a tendency that mechanical properties of a crosslinked composition to be obtained are not improved.

The terminal vinylation ratio is calculated by the number-average molecular weight obtained by GPC, the numbers of the vinyl groups per 1000 carbon atoms obtained by $^1$H-NMR, and the composition of the polyolefin polymer containing vinyl groups at both ends thereof obtained by $^{13}$C-NMR. Here, when the ethylene content is more than 50% by mole, the number-average molecular weight obtained by GPC is converted to the number-average molecular weight, relative to polyethylene standards, from the measurement results. On the other hand, when the propylene content is more than 50% by mole, the number-average molecular weight obtained by GPC is converted to the number-average molecular weight, relative to polypropylene standards, from the measurement results. Further, the chemical shifts obtained by the NMR measurement can be identified by the chemical shifts described in Makromol. Chem., 192, p. 2591-2601 (1991).

[Structural Characteristics of the Polymer]

The polyolefin polymer containing vinyl group at both ends thereof of the present invention may optionally contain each constitutional unit of the α-olefin (b) having 3 to 20 carbon atoms, each of the 1,2-addition product (including the 3,4-addition product) and the 1,4-addition product derived from the polyene (d); and each 5-membered ring (cyclopentane ring) constitutional unit and each 3-membered ring (cyclopropane ring) constitutional unit that are formed in the main chain.

The polymer containing vinyl groups at both ends thereof of the present invention has a constitutional unit derived from at least one of the ethylene (a), α-olefins (b), cyclic olefins (c) and polyene (d) described above, according to the monomers used in the production.

Furthermore, when the polyolefin polymer containing vinyl groups at both ends thereof of the present invention is a polymer containing the constitutional unit derived from polyene (d), it contains at least one constitutional unit of the 1,2-addition product (including the 3,4-addition product) and the 1,4-addition product derived from the polyene (d), but also there may be the case where the 3-membered ring (cyclopropane ring) is contained in the main chain of the polymer.

Furthermore, when the polyolefin polymer containing vinyl groups at both ends thereof of the present invention is the polymer containing the constitutional unit derived from ethylene (a) or an α-olefin (b), and polyene (d), there may be the case where the 5-membered ring (cyclopentane ring) is contained in the main chain of the polymer.

Meanwhile, when the 1,2-addition product and the 3,4-addition product are expressed collectively, they are expressed as the 1,2-addition product (including the 3,4-addition product) in the present specification.

(1) When the polymer of the present invention contains the constitutional unit derived from polyene (d), the 1,2-addition product derived from polyene (d) forms double bond in the side-chain of the polymer and the 1,4-addition body forms the cis or trans double bond in the main chain of the polymer.

The mole ratio of the double bond of side-chain derived from the 1,2-addition product to the main-chain double bond derived from the 1,4-addition product (the number of mole of the double bond of side-chain derived from the 1,2-addition product/the number of mole of the double bond of main-chain derived from the 1,4-addition body) is preferably 5/95 to 99/1, and more preferably 10/90 to 99/1. Further, when $R^1$ is a hydrogen atom and $R^2$ is a hydrogen atom or an alkyl group in the formula [IV], for example butadiene, the mole ratio is further preferably 12/88 to 90/10. Furthermore, when $R^1$ is an alkyl group and $R^2$ is a hydrogen atom in the formula [IV], for example isoprene, the mole ratio is further more preferably 20/80 to 90/10. The presence of the double bond at these mole ratios in the polymer is preferable because the weatherability, the heat resistance, the crosslinking efficiency, the cold resistance, and the modification efficiency of the copolymers are improved.

(2) When the polymer of the present invention contains the constitutional unit derived from at least one kind of the monomer selected from ethylene (a) and an α-olefins (b), and polyene (d), there may be the case where the 5-membered ring (cyclopentane ring) formed via at least two neighboring carbon atoms in the main chain is present. The mole ratio of the total number of moles of the 1,2-addition product and the 1,4-addition product to the number of moles of the 5-membered ring is preferably 20/80 to 90/10. Further, in view of the balance between the glass transition temperature, Tg, and the iodine value in the polymer to be obtained, the mole ratio is preferably 30/70 to 80/20. The mole ratio in the range described above tends to give better transparency of a molded article obtained from the polymer containing the constitutional unit derived from the α-olefin (b) and the polyene (d).

In the 5-membered ring described above, there are the cis configuration and the trans configuration. Though the formation mechanism of the 5-membered ring is not clear, the 5-membered ring is considered to be formed from the α-olefin and the polyene (d) such as a 1,3-conjugated polyene and the like.

As is explained later, the polymer containing the constitutional unit derived from at least one kind of the monomer selected from ethylene (a) and an α-olefin (b), and polyene (d) is produced as follows. Firstly the polyolefin polymer containing a double bond in the main-chain of the molecule, which contains the constitutional unit derived from at least one kind of the monomer selected from ethylene (a) and an α-olefins (b), and polyene (d), is produced as the precursor. During polymerization in order to prepare the precursor, there may be the case where the polyene (d) undergoes the 1,2-addition or the 3,4-addition, and thereafter the ethylene (a) or the α-olefin (b) is added. It is considered that at this instance, the intra-molecular cyclization takes place to form the 5-membered ring.

When the polymer of the present invention contains the constitutional unit derived from polyene (d), there may be the case where the 3-membered ring (cyclopropane ring) is present in the main chain.

The 3-membered ring (cyclopropane ring) is considered to be formed by the intra-molecular cyclization after the formation of the 1,2-addition product and the 3,4-addition product derived from the polyene (d) such as 1,3-butadiene.

As is explained later, the polymer containing the constitutional unit derived from polyene (d) is produced as follows. Firstly the polyolefin polymer containing a double bond in the main-chain of the molecule, which contains the constitutional unit derived from polyene (d), is produced as the precursor. During polymerization in order to produce the precursor, there may be the case where the polyene (d) undergoes the 1,2-addition or the 3,4-addition. It is considered that the 1,2-addition product and the 3,4-addition product then undergo the intra-molecular cyclization to form the 3-membered ring.

It is considered that these 5-membered ring and 3-membered ring contribute to the improvement of the compatibility of the polymer of the present invention with other polymers.

When both of the 3-membered ring and the 5-membered ring are formed in the polymer of the present invention, the mole ratio of the 3-membered ring to the 5-membered ring that are formed (the number of moles of the 3-membered ring/the number of moles of the 5-membered ring) is preferably 0.1/99.9 to 50/50 and more preferably 0.1/99.9 to 30/70.

Specifically, the constitutional unit contained in the polyolefin polymer containing vinyl groups at both ends thereof of the present invention was identified by the following techniques. a) $^1$H-NMR was measured using an NMR sample tube with the inner diameter of 5 mm by NMR instrument with a 400-MHz (EX400, manufactured by JEOL, Ltd.).
b) The measurement conditions of $^1$H-NMR are as follows.
Sample concentration: 20 mg/0.5 mL
Measurement solvent: deuterated 1,2-dichlorobenzene
Measurement temperature: 120° C.
Pulse sequence: single pulse
Point numbers: 32768
Pulse width: 45°
Pulse interval: 7 seconds
Accumulation numbers: 128
Window function: exponential
Standard for chemical shift: the main signal (long chain CH$_2$) was taken as 1.2 ppm.
c) $^{13}$C-NMR was measured using an NMR sample tube with the inner diameter of 5 mm by NMR instrument with a 125-MHz (ECP500, manufactured by JEOL, Ltd.).
d) The measurement conditions of $^{13}$C-NMR are as follows.
Sample concentration: 70 mg/0.5 mL
Measurement solvent: deuterated 1,1,2,2-tetrachloroethane
Measurement temperature: 120° C.
Pulse sequence: single pulse $^1$H broad band decoupling
point numbers: 32768
Pulse width: 45°
Pulse interval: 5.5 seconds
Accumulation numbers: 8000 to 10000
Window function: exponential
Standard for chemical shift: the long chain CH$_2$ (δδ) signal was taken as 29.73 ppm.

In the following, the calculation method is shown by taking ethylene-propylene-1,3-butadiene copolymer as a specific example. The composition of the ethylene-propylene-1,3-butadiene copolymer was calculated from the measurement results of $^1$H-NMR and $^{13}$C-NMR by using the following equations. Here, Ia shows the relative integrated intensity of the signal a. The assignments of $^1$H-NMR signals are shown in Table A and the assignments of $^{13}$C-NMR signals are shown in Table B.

$$Ethylene(\% \text{ by mole})=E/(E+P+BD)\times 100$$

$$Propylene(\% \text{ by mole})=P/(E+P+BD)\times 100$$

$$1,3\text{-Butadiene}(\% \text{ by mole})=BD/(E+P+BD)\times 100$$

<$^1$H-NMR>

$$E=[\Sigma H-I_o\times 2R-5I_q/2-6(I_s/2+I_t)+I_u]/4$$

$$P=(I_o\times R)/3+I_q/2$$

$$BD=I_s/2+I_t$$

Here, $R=I_a/(I_a+I_d)$, and R was obtained from $^{13}$C-NMR.

In $^1$H-NMR, the signals of the cyclic structure derived from 1,3-butadiene (1,2-addition) overlap with the signals of the main chain. Therefore, the composition of ethylene-propylene-1,3-butadiene copolymer was determined by regarding part (cyclic structure) of 1,3-butadiene (1,2-addition) as ethylene.
<$^{13}$C-NMR>

$$E=[\Sigma C-3(I_d+I_h)-2I_t-4I_j-2\{(I_g \text{ or } I_e)+I_f\}-2(I_b+I_c)]/2$$

$$P=I_d+I_h$$

$$BD=I_t/2+I_j+\{(I_g \text{ or } I_e)+I_f\}/2+(I_b+I_c)/2$$

Here, the breakdown of the 1,3-butadiene (1,2-addition) structure (double bond/5-membered ring/3-membered ring) was calculated from the measurement results of $^{13}$C-NMR by using the following equations.

$$\text{Double bond}(\%)=I_j/1,3\text{-butadiene}(1,2\text{-addition})$$

$$\text{5-Membered ring}(\%)=[\{(I_g \text{ or } I_e)+I_f\}/2]/1,3\text{-butadiene } (1,2\text{-addition})$$

$$\text{3-Membered ring}(\%)=\{(I_b+I_c)/2\}/1,3\text{-butadiene } (1,2\text{-addition})$$

$$1,3\text{-Butadiene}(1,2\text{-addition})=I_j+\{(I_g \text{ or } I_e)+I_f\}/2+(I_b+I_c)/2$$

Here, each number of the double bonds was calculated from the measurement results of $^1$H-NMR and $^{13}$C-NMR by using the following equations.
<$^1$H-NMR>

$$\text{The number of 1,4-added double bonds}(/1000C)=500I_s/\text{the total number of carbons}$$

$$\text{The number of 1,2-added double bonds}(/1000C)=1000I_t/\text{the total number of carbons}$$

$$\text{The number of vinyl groups}(/1000C)=1000I_u/\text{the total number of carbons}$$

$$\text{The number of vinylidene groups}(/1000C)=500I_q/\text{the total number of carbons}$$

$$\text{The total number of carbons}=[\Sigma H+I_q/2+I_u+I_s+2I_t]/2$$

<$^{13}$C-NMR>

$$\text{The number of 1,4-added double bonds}(/1000C)=500I_i/\Sigma C$$

$$\text{The number of 1,2-added double bonds}(/1000C)=1000I_j/\Sigma C$$

$$\text{The number of vinyl groups}(/1000C)=1000(I_i+I_k)/\Sigma C$$

$$\text{The number of vinylidene groups}(/1000C)=1000I_h/\Sigma C$$

Here, the number of methyl groups at the ends was calculated from the measurement results of $^{13}$C-NMR by using the following equations.

$$\text{The number of terminal methyl groups at the ends}(/1000C)=1000I_a/\Sigma C$$

TABLE 1

| Table A | | |
|---|---|---|
| Signal | Chemical shift (ppm) | Assignment |
| o | 0.0-0.9 | Methyl group(propylene, terminal) (3H) |
| p | 0.9-2.4 | Methine group, methylene group |
| q | 4.5-4.8 | Vinylidene group (2H) |
| r | 4.8-5.0 | Vinyl group 1,2-addition (2H) |
| s | 5.2-5.4 | 1,4-addition (2H) |
| t | 5.4-5.6 | 1,2-addition (1H) |
| u | 5.6-5.8 | Vinyl group (1H) |

TABLE 2

Table B

| Signal | Chemical shift (ppm) | Assignment |
|---|---|---|
| a | 14.0 | Terminal methyl group |
| b | 16.1 | 3-Membered ring methine (Cis, 2C) |
| c | 19.0 | 3-Membered ring methine (Trans, 2C) |
| d | 19.3-22.2 | Methyl group (propylene) |
| e | 35.4-35.8 | 5-Membered ring methylene (Trans, 2C) |
| f | 42.6-43.1 | 5-Membered ring methine (Cis, 2C) |
| g | 46.0-46.3 | 5-Membered ring methine (Trans, 2C) |
| h | 109.7 | Vinylidene group methylene |
| i | 111.5 | Vinyl group methylene (Branching at α-position) |
| j | 113.4 | 1,2-Addition methylene |
| k | 114.0-114.1 | Vinyl group methylene |
| l | 130.3-130.7 | 1,4-Addition methine (2C) |

[Characteristics of the Polymer (2): Intrinsic Viscosity]

The polyolefin polymer containing vinyl groups at both ends thereof of the present invention has an intrinsic viscosity [η] of 0.01 to 10 dL/g as measured in Decalin® solution at 135° C. The intrinsic viscosity is preferably 0.05 to 7.0 dL/g and more preferably 0.07 to 5.0 dL/g. The 5 intrinsic viscosity within the range gives excellent mechanical characteristics to the crosslinked body obtained from this polymer. In addition, the polymer itself is excellent in acid resistance, gas permeation resistance, hydrolysis resistance, and dynamic fatigue resistance, and 10 may be molded by a LIM molding, an injection molding, a transfer molding, a compression molding, and the like.

[Mole Ratio of Constitutional Unit Derived from Monomers]

It is preferable that the polyolefin polymer containing vinyl groups at both ends thereof of the present invention contains the constitutional unit derived from the ethylene (a), the α-olefin having 3 to 20 carbon atoms (b), the cyclic olefin (c), the polyene (d), the propylene (e), and the α-olefin having 4 to 20 carbon atoms (f) in the following mole ratios.

(1) When the polyolefin polymer containing vinyl groups at both ends thereof of the present invention is composed of the constitutional unit derived from the ethylene (a), the α-olefin (b), and the cyclic olefin (c), the ratio of the number of moles a of the constitutional unit derived from the ethylene (a) to the total number of moles b of the constitutional unit derived from the α-olefin (b) and moles c of the constitutional unit derived from the cyclic olefin (c), namely a/(b+c), is preferably in the range of 99/1 to 50/50, more preferably in the range of 99/1 to 55/45, and further more preferably 97/3 to 60/40. The mole ratio more than 99/1 tends to give poor flexibility to the obtained polyolefin polymer containing vinyl groups at both ends thereof. The mole ratio less than 50/50 tends to give poor low-temperature characteristics to the obtained polyolefin polymer containing vinyl groups at both ends thereof.

(2) When the polyolefin polymer containing vinyl groups at both ends thereof of the present invention is composed of the constitutional unit derived from the ethylene (a), the α-olefin (b), the cyclic olefin (c), and the polyene (d), the ratio of the number of moles a of the constitutional unit derived from the ethylene (a) to the total number of moles b of the constitutional unit derived from the α-olefin (b), moles c of the constitutional unit derived from the cyclic olefin (c), and moles d of the constitutional unit derived from the polyene (d), namely a/(b+c+d), is preferably in the range of 99/1 to 50/50, more preferably in the range of 99/1 to 55/45, and further more preferably in the range of 97/3 to 60/40. The mole ratio more than 99/1 tends to give poor flexibility to the obtained polyolefin polymer containing vinyl groups at both ends thereof. The mole ratio less than 50/50 tends to give poor low-temperature characteristics to the obtained polyolefin polymer containing vinyl groups at both ends thereof.

(3) When the polyolefin polymer containing vinyl groups at both ends thereof of the present invention is composed of the constitutional unit derived from the ethylene (a), the cyclic olefin (c), the propylene (e), and the α-olefin (f) having 4 to 20 carbon atoms, the ratio of the number of moles e of the constitutional unit derived from the propylene (e) to the total number of moles a of the constitutional unit derived from the ethylene (a), moles f of the constitutional unit derived from the α-olefin (f) having 4 to 20 carbon atoms, and moles c of the constitutional unit derived from the cyclic olefin (c), namely e/(a+f+c), is preferably in the range of 99/1 to 50/50, more preferably in the range of 99/1 to 55/45, and further more preferably in the range of 97/3 to 60/40. The mole ratio more than 99/1 tends to give poor flexibility to the obtained polyolefin polymer containing vinyl groups at both ends thereof. The mole ratio less than 50/50 tends to give poor rigidity to the obtained polyolefin polymer containing vinyl groups at both ends thereof.

(4) When the polyolefin polymer containing vinyl groups at both ends thereof of the present invention is composed of the constitutional unit derived from the ethylene (a), the cyclic olefin (c), the polyene (d), the propylene (e), and the α-olefin having 4 to 20 carbon atoms (f), the ratio of the number of moles e of the constitutional unit derived from the propylene (e) to the total number of moles a of the constitutional unit derived from the ethylene (a), moles f of the constitutional unit derived from the α-olefin (f) having 4 to 20 carbon atoms, moles c of the constitutional unit derived from the cyclic olefin (c), and moles d of the constitutional unit derived from the polyene (d), namely e/(a+f+c+d), is preferably in the range of 99/1 to 50/50, more preferably in the range of 99/1 to 55/45, and further more preferably in the range of 97/3 to 60/40. The mole ratio more than 99/1 tends to give poor flexibility to the obtained polyolefin polymer containing vinyl groups at both ends thereof. The mole ratio less than 50/50 tends to give poor rigidity to the obtained polyolefin polymer containing vinyl groups at both ends thereof.

(5) When the polyolefin polymer containing vinyl groups at both ends thereof of the present invention is composed of the constitutional unit derived from the ethylene (a), the cyclic olefin (c), the propylene (e), and the α-olefin (f) having 4 to 20 carbon atoms, the ratio of the number of moles f of the constitutional unit derived from the α-olefin (f) having 4 to 20 carbon atoms to the total number of moles a of the constitutional unit derived from the ethylene (a), moles e of the constitutional unit derived from the propylene (e), and moles c of the constitutional unit derived from the cyclic olefin (c), namely f/(a+e+c), is preferably in the range of 99/1 to 50/50, more preferably in the range of 99/1 to 55/45, and further more preferably in the range of 97/3 to 60/40. The mole ratio more than 99/1 tends to give poor flexibility to the obtained polyolefin polymer containing vinyl groups at both ends thereof. The mole ratio less than 50/50 tends to give poor rigidity to the obtained polyolefin polymer containing vinyl groups at both ends thereof.

(6) When the polyolefin polymer containing vinyl groups at both ends thereof of the present invention is composed of the constitutional unit derived from the ethylene (a), the cyclic olefin (c), the polyene (d), the propylene (e), and the α-olefin (f) having 4 to 20 carbon atoms, the ratio of the number of moles f of the constitutional unit derived from the α-olefin (f) having 4 to 20 carbon atoms to the total number of moles a of the constitutional unit derived from the ethylene (a), moles e of the constitutional unit derived from the propylene (e), moles c of the constitutional unit derived from the cyclic olefin (c), and moles d of the constitutional unit derived from the polyene (d), namely f/(a+e+c+d), is preferably in the range of 99/1 to 50/50, more preferably in the range of 99/1 to 55/45, and further more preferably in the range of 97/3 to 60/40. The mole ratio of less than 50/50 tends to give poor rigidity to the obtained polyolefin polymer containing vinyl groups at both ends thereof.

[Characteristics of the Polymer (3): Stereoregularity]

When the polyolefin polymer containing vinyl groups at both ends thereof of the present invention contains the constitutional unit derived from propylene (e), it is preferable that the stereoregularity of the constitutional unit derived from propylene (e) satisfies any one of the following conditions i) to iii):

i) the mesotriad fraction (mm) obtained from the $^{13}$C-NMR is 50% or more, ii) the racemotriad fraction (rr) obtained from the $^{13}$C-NMR is 50% or more, or iii) the mesotriad fraction obtained from the $^{13}$C-NMR is less than 50% and the racemotriad fraction obtained from the $^{13}$C-NMR is less than 50%.

Here, the measurement instrument for $^{13}$C-NMR is the same as the instrument used in order to obtain the characteristics of the polymer (1) (terminal vinylation ratio).

When the mesotriad fraction (mm) is 50% or more, the stereoregularity of the constitutional unit derived from propylene (e) in the polyolefin polymer containing vinyl groups at both ends thereof of the present invention is isotactic, and gives excellent heat resistance and rigidity. When the racemotriad fraction (rr) is 50% or more, the stereoregularity of the constitutional unit derived from propylene (e) in the polyolefin polymer containing vinyl groups at both ends thereof of the present invention is syndiotactic, and gives excellent heat resistance, transparency, and flexibility. When the mesotriad fraction is less than 50% and the racemotriad fraction is less than 50%, the stereoregularity of the constitutional unit derived from propylene (e) in the polyolefin polymer containing vinyl groups at both ends thereof of the present invention is atactic, and gives excellent transparency and flexibility.

When the polyolefin polymer containing vinyl groups at both ends thereof of the present invention contains the constitutional unit derived from propylene (e), the mesotriad fraction (mm) of the constitutional unit derived from propylene (e) is obtained from the triad tacticity at the propylene unit chain part bonded by the head-to-tail fashion. This triad tacticity is obtained from the $^{13}$C-NMR spectra by using the following equation.

[Formula 17]

$$\text{Triad tacticity (\%)} = \frac{\text{PPP (mmm)}}{\text{PPP (mm)} + \text{PPP (mr)} + \text{PPP (rr)}} \times 100$$

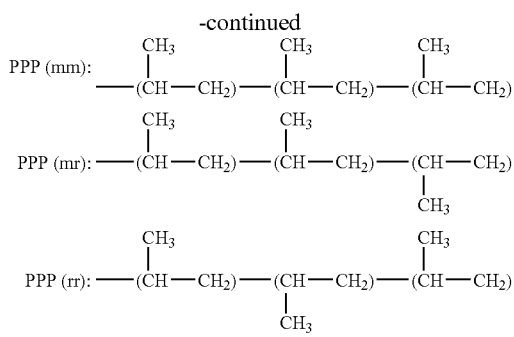

In the equation, ppp (mm), ppp (mr), and ppp (rr) show the respective peak areas derived from the methyl group at the second unit in the three consecutive propylene chain units chain bonded by the head-to-tail fashion expressed by the chemical formulae as described above.

Similarly, the racemotriad fraction (rr) is obtained by the following equation.

Racemotraid fraction(%)={PPP(rr)/(PPP(mm)+PPP(mr)+PPP(rr))}×100

Specific measurement conditions are as follows.
a) In an NMR sample tube having 5-mm diameter, a sample of 50 to 70 mg is completely dissolved in approximately 0.5 mL of hexachlorobutadiene, o-dichlorobenzene, or 1,2,4-trichlorobenzene, containing approximately 0.05 mL of deuterated benzene as a rock solvent. Then, the $^{13}$C-NMR spectrum is measured at 120° C. by the complete proton decoupling method.
b) As the measurement conditions, the flip angle of 45 degree and the pulse interval of $3.4T_1$, or more (among the spin lattice relaxation times of the methyl group, the longest value is taken as $T_1$) are selected. Since $T_1$ of the methylene group and the methine group are shorter than that of the methyl group, the magnetization recovery under this condition is 99% or more. The chemical shift at the 21.59 ppm peak value attributable to the methyl group at the third unit in the five consecutive propylene units bonded in a head-to-tail manner was taken as the standard peak.

Assignment of the peaks and calculation of each fraction are carried out as follows.
c) The spectrum related to the methyl carbon region (16 to 23 ppm) is classified into the following regions, namely the first region (21.2 to 21.9 ppm), the second region (20.3 to 21.0 ppm), the third region (19.5 to 20.3 ppm), and the fourth region (16.5 to 17.5 ppm). Here, each peak in the spectrum is assigned according to the reference (Polymer, 30 (1989) 1350).
d) In the first region, the methyl group at the second unit in the three consecutive propylene units shown by PPP(mm) resonates. In the second region, the methyl group at the second unit in the three consecutive propylene units shown by PPP (mr) and the methyl group in the propylene unit whose neighboring units are the propylene unit and the ethylene unit (hereinafter referred to as the PPE-methyl group) resonate (near 20.7 ppm).
e) In the third region, the methyl group at the second unit in the three consecutive propylene units shown by PPP(rr) and the methyl group in the propylene unit whose both neighboring units are the ethylene unit (hereinafter referred to as the EPE-methyl group) resonate (near 19.8 ppm). Furthermore, the polymer containing the constitutional units derived from propylene (e) has the following structures (i) and (ii) as the partial structure containing positional irregular units.

[Formula 18]

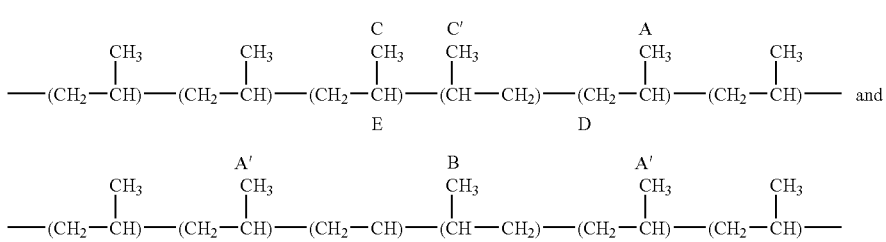

f) Among them, the carbon A peak and the carbon A' peak appear in the second region, and the carbon B peak appears in the third region. Further, the carbon C peak and the carbon C' peak appear in the fourth region. Thus, among the peaks appearing in the first to the fourth regions, the peaks not based on the three consecutive propylene units bonded in a head-to-tail manner are the peaks based on the PPE-methyl group, the EPE-methyl group, the carbon A, the carbon A', the carbon B, the carbon C, and the carbon C'.

g) Among them, the peak area based on the PPE-methyl group is obtained from the peak area of the PPE-methine group (resonance at near 30.6 ppm), and the peak area based on the EPE-methyl group is obtained from the peak area of the EPE-methine group (resonance at near 32.9 ppm). The peak area based on the carbon A is obtained from ½ of the sum of the peak areas of the carbon D and the carbon E (resonance at near 35.6 ppm and at near 35.4 ppm) of the positional irregular part structure (structure (i)). The peak area based on the carbon A' is obtained from the ½ of the sum of the peak areas of the αβ methylene carbons (resonance at near 34.3 ppm and at near 34.5 ppm) in the positional irregular part structure (structure (ii)). The peak area based on the carbon B is obtained from the peak area of the neighboring methine carbon (resonance at near 33.7 ppm).

h) It is not necessary to consider the positions of the carbon C peak and the carbon C' peak, because they are not related to the peak of the three consecutive propylene units (PPP) at all. Accordingly, the peak area based on the three consecutive propylene units bonded in a head-to-tail manner (PPP(mr) and PPP(rr)) is obtained by subtracting these peak areas from the peak areas in the second and the third regions.

i) By the procedures as mentioned above, the peak areas of PPP (mm), PPP (mr), and PPP (rr) are obtained. Then, the mesotriad fraction (mm) and the racemotriad (rr) fraction in the consecutive propylene units composed of the head-to-tail bond were obtained from the obtained peak areas of the PPP (mm), PPP (mr), and PPP (rr) as well as the equation.

[Production of the Polyolefin Polymer Containing Vinyl Groups at Both Ends Thereof]
[Introduction of the Terminal Vinyl Groups]

As the methods for producing the polyolefin polymers containing vinyl groups at both ends thereof of the present invention, there may be mentioned a method for polymerizing in such a way as to introduce the vinyl groups into the chain terminals of the molecular chain by using a publicly known catalyst, a method in which its precursor polymer is prepared once and then the molecular chain of the precursor is cut to form the vinyl groups at the ends of the polymer, and the like.

As the method for cutting the molecular chain as mentioned above, there may be mentioned a method of thermal cutting under an inert gas atmosphere, a method of cutting by a radiation beam or an electronic beam, a method of cutting by using an organic peroxide and the like, a method of cutting by reacting a polyolefin polymer containing double bond inside the main chain of the polymer with ethylene and an organometallic complex, and others.

In addition, when the content of the constitutional unit derived from ethylene is 50% by mole or more in the precursor polymer, a method of thermal cutting may also be used under an inert gas atmosphere. On the contrary, when the content of the constitutional unit derived from ethylene is less than 50% by mole in the precursor polymer, many of the terminal vinylidene groups and the like are formed, and the content of the terminal vinyl groups is remarkably decreased.

Among these production methods, the method of forming the vinyl groups at the polymer terminal by cutting the molecular chain of the precursor after the preparation of the precursor polymer is preferable, and the method of cutting the molecular chain by reacting the precursor with ethylene and an organometallic complex after the preparation of the polyolefin polymer containing double bond inside the main chain as the precursor is more preferable.

In the following, the methods of cutting the molecular chain by reacting polyolefin polymer containing double bond inside the main chain, as the precursor, with ethylene and an organometallic complex will be explained more specifically.

Among the methods of cutting the molecular chain by the reaction of polyolefin polymer containing double bond inside the main chain as the precursor, ethylene, and an organometallic complex, the method of cutting by a metathesis reaction that will be explained below is preferable.

[Metathesis Reaction (1): General Conditions]

The polyolefin polymers containing vinyl groups at both ends thereof of the present invention are obtained by the reaction of polyolefin polymer containing double bond inside the main chain of the molecule as the precursor, ethylene, and an organometallic complex. Specifically, the polyolefin polymer is dissolved in advance in an organic solvent that is capable of dissolving the polymer, such as toluene and the like, and then the resultant is treated in the presence of a publicly known metathesis catalyst at the reaction temperature of 80 to 200° C. and the reaction pressure (pressurized by an ethylene gas) of 0.01 to 20 MPa (gauge pressure) to obtain the polyolefin polymer containing vinyl groups at both ends thereof of the present invention.

The reaction time may be arbitrarily selected according to the kinds of the reaction, but is usually in the range of 1 minute to 1 week.

[Metathesis Reaction (2): Catalyst]

As the metathesis catalyst, there may be mentioned tungsten hexachloride/tetramethyl tin/propyl acetate, the Grubbs catalyst which is the organometallic complex (disclosed, for example, in J. Am. Chem. Soc., 2003, 125, 1136-1137 and J.

Am. Chem. Soc., 2004, 126, 7414-7415), the Schrock catalyst (disclosed, for example, in J. Am. Chem. Soc., 2001, 123, 3139-3140), and the like.

As the organometallic complex, there may be mentioned a Ru organometallic complex disclosed in the Japanese Patent Laid-Open Publication No. 2004-187804 and the like, a W organometallic complex disclosed in the Japanese Patent Laid-Open Publication No. 2003-307873 and the like, a Mo organometallic complex, and others. Here, the organometallic complexes disclosed in the above references and the like may be used without particular restrictions.

Among these catalysts, tungsten hexachloride/tetramethyl tin/propyl acetate and the Grubbs catalyst are preferable.

The amount of the metathesis catalyst to be used relative to the polyolefin polymer is not particularly restricted, but in the case of a Ru organometallic complex, the complex is used in an amount at the mole ratio of the ruthenium metal in the catalyst to the double bond in the polyolefin polymer in the range of usually 1:100 to 1:2,000,000, preferably 1:500 to 1,000,000, and more preferably 1:1,000 to 1,500,000.

The amount of the metathesis catalyst to be used relative to the polyolefin polymer is not particularly restricted, but in the case of a Ru organometallic complex, the complex is used in an amount at the mole ratio of the double bond in the polyolefin polymer to the ruthenium metal in the catalyst in the range of usually 1:0.001 to 1, preferably 1:0.005 to 1, and more preferably 1:0.01 to 0.5. In the case of tungsten hexachloride/tetramethyl tin/propyl acetate, the mole ratio of the double bond in the polyolefin polymer to tungsten hexachloride/tetramethyl tin/propyl acetate is usually 1:0.001 to 1/0.001 to 10/0.001 to 50, preferably 1:0.005 to 1/0.005 to 5/0.005 to 10, and more preferably 1:0.01 to 0.5/ 0.02 to 1/0.05 to 1.

When the catalyst amount is extremely large, the removal of the catalyst becomes difficult, while when the amount is extremely small, the sufficient reaction activity may not be obtained.

[Metathesis Reaction (3): Solvent]

The metathesis reaction is carried out without solvent or in a solvent. The solvent may be appropriately selected in accordance with the kind of the polyolefin polymer as the precursor, but a solvent that is capable of dissolving the polyolefin polymer is particularly preferable. In such a case, there are no particular restrictions with regard to the kind of solvents such as polar or non-polar, and the like. Here, even when the solvent that is partly capable of dissolving or does not dissolve the polyolefin polymer is used, the metathesis reaction may be carried out in a suspension or an emulsion state. Even in such cases, the kind of solvent is not particularly restricted. The solvents may be used as a mixture of two or more kinds.

The solvent may be exemplified by a linear aliphatic hydrocarbon such as n-pentane, n-hexane and the like, an alicyclic hydrocarbon such as cyclopentane, cyclohexane and the like, and an aromatic hydrocarbon such as benzene, toluene, tetrahydronaphthalene and the like, and others. The solvent may be further exemplified by a nitro compound such as nitromethane, nitrobenzene and the like, a nitrile compound such as acetonitrile, benzonitrile and the like, and ethers such as diethyl ether, tetrahydrofuran and the like.

The mixing ratio of the polyolefin polymer to the solvent is not particularly restricted, but the concentration of the polyolefin polymer in the reaction solution is usually in the range of 0.01 to 90% by weight, preferably 0.02 to 70% by weight, and more preferably 0.05 to 60% by weight. When the concentration of the polyolefin polymer is 0.01% by weight or lower, the productivity is lowered.

[Polyolefin Polymers Containing Double Bond Inside the Main Chain of the Molecule Used for the Metathesis Reaction and the Production Thereof]

[Monomers]

The polyolefin polymers containing double bond inside the main chain of the molecule used for the metathesis reaction in the invention are obtained by polymerizing at least one kind of the monomer selected from the ethylene (a), the α-olefin having 3 to 20 carbon atoms (b), and the cyclic olefin (c), and at least one kind of the monomer selected from the polyene (d).

Further, when the α-olefin having 3 to 20 carbon atoms is used in combination of two or more kinds, it is preferable that one kind of them is the propylene (e) and the rest is the α-olefin (f) having 4 to 20 carbon atoms.

Specific examples of (a) to (f) are the same as those shown in the section [Polyolefin polymers containing vinyl groups at both ends thereof].

[Characteristics of the Polyolefin Polymers Containing Double Bond Inside the Main Chain of the Molecule]

In the polyolefin polymers containing double bond inside the main chain of the molecule used for the metathesis reaction in the present invention, it is preferable that the content of the polyene (d) is 0.1 to 20% by mole and its intrinsic viscosity [η] is 0.05 to 100 dL/g. When the content of the polyene (d) is less than 0.1% by mole or the intrinsic viscosity [η] is less than 0.05 dL/g, there is a tendency that the bond breakage occurs less frequently in the metathesis reaction and thus the polyolefin polymer containing vinyl bonds at both ends thereof of the present invention is difficult to obtain. When the content of the polyene (d) is more than 20% by mole or the intrinsic viscosity [η] is more than 100 dL/g, the solubility of the polyolefin polymer in the solvent is lowered in the metathesis reaction, and the production of the polyolefin polymer containing vinyl bonds at both ends thereof may be difficult in some cases.

[Polymerization Catalyst]

The catalysts to be used in the production of the polyolefin polymers containing double bond inside the main chain of the molecule that is used for the metathesis reaction of the present invention are not particularly restricted as long as it is capable of polymerizing the monomers, and for instance a publicly known olefin polymerization catalyst may be used.

The olefin polymerization catalysts may be exemplified by the metallocene compounds shown by the general formulae (1) and (2) disclosed in page 14 of the pamphlet of WO 2001/27124 (the metallocene catalysts formed from a cyclopentene ring with a substituent group and a fluorene ring with or without a substituent group). When these catalysts are used, the metallocene compound may be used together with the component (B) composed of at least one kind from (B-1) to (B-3) disclosed in page 193 of the pamphlet, and if necessary further with the component (C) disclosed in page 194 of the pamphlet. The conditions disclosed in the pamphlet may also be applied to the ratio of each component to be used in the present invention.

Further, the olefin polymerization catalysts may also be exemplified by the metallocene compounds shown by the general formula [I] disclosed in page 8 of the pamphlet of WO 2004/29062 (the metallocene catalysts formed from a cyclopentene ring without a substituent group and a fluorene ring with or without a substituent group). When this catalyst is used, the metallocene compound may be used together with the component (B) composed of at least one kind from (B-1) to (B-3) disclosed in page 46 of the pamphlet, and if necessary further with the component (C) disclosed in page 49 of the pamphlet. More specifically, the compounds represented by the general formula [I] disclosed in the pamphlet are the compound W1 represented by the general formula [I-1] disclosed in page 11, the compound W2 represented by the general formula [I-2] disclosed in page 17, the compound W3 represented by the general formula [I-3] disclosed in page 26, the compound W4 represented by the general formula [I-4] disclosed in page 30, and the compound W5 represented by the general formula [I-5] disclosed in page 34. The conditions disclosed in the pamphlet may also be applied to the ratio of each component to be used in the present invention.

Further, the olefin polymerization catalyst may also be a transition metal compound catalyst, and the transition metal compound catalyst is exemplified by the transition metal complex represented by the formula (I) disclosed in the paragraph 0024 of the Japanese Patent Laid-Open Publication No. H09-235313 (a metallocene catalyst formed from an indene ring and a fluorene ring). The compound disclosed in the paragraph 0045 of the publication may be mentioned as the specific example of the transition metal complex. When this catalyst is used, the transition metal complex may be used together with the component (B) disclosed in the paragraph 0094 of the publication, and if necessary further with the component (C) disclosed in the same paragraph. The conditions disclosed in the publication may also be applied to the ratio of each component to be used in the present invention.

Furthermore, the olefin polymerization catalyst may also be the catalyst for polymerizing an ethylenically unsaturated monomer having a certain structure. The catalyst for polymerizing an ethylenically unsaturated monomer having a certain structure may be exemplified by (I) disclosed in the paragraph 0175 of the Japanese Patent Laid-Open Publication No. 2000-191713, (II) disclosed in the paragraph 0191, (II') disclosed in the paragraph 0207, (II") disclosed in the paragraph 0220, (IIa) disclosed in the paragraph 0230, (III') disclosed in the paragraph 0242, (IV) disclosed in the paragraph 0250, (V) disclosed in the paragraph 0279, (V') disclosed in the paragraph 0303, (VI) disclosed in the paragraph 0331, (VII) disclosed in the paragraph 0390, (VIII) disclosed in the paragraph 0415, (VIIIa) disclosed in the paragraph 0432, and (VIIIb) disclosed in the paragraph 0442. Specific examples of the catalyst for polymerizing an ethylenically unsaturated monomer having a certain structure are disclosed in the paragraph 0188 for (I), in the paragraph 0205 for (II), in the paragraphs 0214 to 0218 for (II'), in the paragraphs 0226 to 0228 for (II"), in the paragraph 0238 for (IIa), in the paragraph 0248 for (III'), in the paragraphs 0263 to 0276 for (IV), in the paragraphs 0296 to 0300 for (V), in the paragraphs 0316 to 0329 for (V'), in the paragraphs 0366 to 0389 for (VI), in the paragraphs 0405 to 0406 for (VII), and in the paragraphs 0451 to 0461 for (VIII), (VIIIa), and (VIIIb). And further, the transition metal compounds other than the transition metal complexes represented by any one of (I) to (VIII) are disclosed in the paragraph 0465. The conditions disclosed in the publication may also be applied to the ratio of each component to be used in the present invention.

Among the catalysts mentioned above, the transition metal complex shown by the formula (I) disclosed in the paragraph 0024 of the Japanese Patent Laid-Open Publication No. H09-235313, the metallocene compounds represented by the general formulae (1) and (2) disclosed in page 14 of the pamphlet of WO 2001/27124, and (II') disclosed in the paragraph 0207 and (II") disclosed in the paragraph 0220 of the Japanese Patent Laid-Open Publication No. 2000-191713, are particularly suitable for the production of the polyolefin polymer containing vinyl groups at both ends thereof with the mesopentad of more than 50%. The metallocene compound represented by the general formula [I] disclosed in page 8 of the pamphlet of WO 2004/29062 is suitable for the production of the polyolefin polymer containing vinyl groups at both ends thereof with the racemopentad of more than 50%. Further, the metallocene catalyst shown by (III') disclosed in the paragraph 0242 of the Japanese Patent Laid-Open Publication No. 2000-191713 is suitable for the production of the polyolefin polymer containing vinyl groups at both ends thereof with the mesopentad of less than 50% and the racemopentad of less than 50%. Furthermore, (VI) disclosed in the paragraph 0331 of the Japanese Patent Laid-Open Publication No. 2000-191713 is suitable for the production of the polyolefin polymer containing double bond inside the main chain of the molecule with less 5-membered and 3-membered structures.

[General Conditions for Polymerization]

The polyolefin polymer containing double bond inside the main chain of the molecule to be used for the metathesis reaction in the present invention may be obtained, for example, by polymerization in the presence of the catalyst. The polymerization temperature is usually −20 to 150° C., preferably 0 to 120° C., and more preferably 0 to 100° C. The polymerization pressure is usually more than 0 to 8 MPa (gauge pressure), and preferably more than 0 to 5 MPa (gauge pressure). The polymerization time (which is the average residence time in the case that the copolymerization is carried out by the continuous process) is usually 0.5 minute to 3 hours, and preferably 10 minutes to 1.5 hours, though it varies depending on the conditions such as the catalyst concentrations, the polymerization temperatures and the like. Further, a molecular weight regulator such as hydrogen and the like may also be used for the copolymerization.

The polyolefin copolymer containing double bond inside the main chain of the molecule to be used for the metathesis reaction obtained as mentioned above is generally obtained as a solution containing the polymer therein. By treating this polymer solution by a publicly known method, the polyolefin copolymer containing double bond inside the main chain of the molecule to be used for the metathesis reaction may be isolated.

[Mole Ratio of Constitutional Units and Stereoregularity]

It is preferable that the polyolefin polymer containing double bond inside the main chain of the molecule to be used for the metathesis reaction in the present invention contains each constitutional unit derived from the ethylene (a), the α-olefin (b) having 3 to 20 carbon atoms, the cyclic olefin (c), the polyene (d), propylene (e), and the α-olefin (f) having 4 to 20 carbon atoms at the same mole ratio as in the case of the polyolefin polymer containing vinyl groups at both ends thereof.

Furthermore, it is also preferable that the stereoregularity of the polyolefin polymer containing double bond inside the main chain of the molecule to be used for the metathesis reaction satisfies any one of i) to iii) conditions described in the section of [Characteristics of the polymer (3): stereoregularity], as in the case of the polyolefin polymer containing vinyl groups at both ends thereof.

[Thermoplastic Resin Composition]

The thermoplastic resin composition of the present invention contains the polyolefin polymer containing vinyl groups at both ends thereof of the present invention and at least one kind of other thermoplastic resin (A).

[Thermoplastic Resin (A)]

As the thermoplastic resin (A) to be used for the present invention, any resins may be used without specific restrictions as long as it shows thermoplasticity.

The thermoplastic resin (A) may be exemplified by a polyethylene resin, a polypropylene resin, a polybutene resin, a poly-4-methyl-1-pentene resin, a polystyrene resin, a poly-acrylonitrile resin, a styrene-acrylonitrile copolymer resin (an AS resin), an acrylonitrile-butadiene-styrene copolymer resin (an ABS resin), a polyacetal resin, a poly(methyl methacrylate) resin, a methyl methacrylate-styrene copolymer resin, a polyester resin, a polyamide resin, a polyimide resin, a polyurethane resin, a nylon resin, a cellulose resin, a fluorine resin such as PTFE and PVdF, and the like. These resins may be used alone or in a mixture of two or more kinds.

Among these thermoplastic resins (A), a polyethylene resin, a polypropylene resin, a polybutene resin, and a poly-4-methyl-1-pentene resin are preferable.

The thermoplastic resin (A) of the present invention further contains a rubber as well. Such rubber may be exemplified by a natural rubber (NR), an isoprene rubber (IR), a styrene-butadiene rubber (SBR), a nitrile rubber (NBR), a butadiene rubber (BR), a chloroprene rubber (CR), a chlorosulfonated polyethylene (CSM), a butyl rubber (IIR), a chlorinated polyethylene (CPE), a nitrile-isoprene rubber (NIR), an acryl rubber (ACM), an urethane rubber, an epichlorohydrin rubber (CHR), a silicon rubber, an ethylene-α-olefin copolymer rubber, an ethylene-α-olefin-non-conjugated polyene copolymer rubber, a fluorine rubber, and the like. These rubbers may be used alone or in a mixture of two or more kinds.

[Crosslinkable Resin Composition]

The crosslinkable resin composition of the present invention contains the polyolefin polymer containing vinyl groups at both ends thereof of the present invention or the thermoplastic resin compositions, and a crosslinking agent. The crosslinkable resin composition can be converted to a crosslinked article by crosslinking.

[Crosslinking Agent]

The crosslinking agent to be used for the present invention is not particularly restricted as long as it can crosslink at least part of the polymer or the thermoplastic resin composition of the present invention, but at least one kind of the crosslinking agent selected from sulfur (B-1), a compound (B-2) containing at least two hydrosilyl groups in the molecule, and an organic peroxide (B-3) is preferable.

[Sulfur (B-1)]

As the sulfur (B-1), a commercially available sulfur may be used as it is, or if necessary after performing a pre-treatment such as pulverization, high purification, and the like. The amount of the sulfur (B-1) to be used is preferably 0.1 to 10 parts by weight to 100 parts by weight of the polyolefin polymer containing vinyl groups at both ends thereof.

[SiH-Containing Compound (B-2)]

There is no specific restriction in the compound containing at least two hydrosilyl groups in the molecule (B-2) (hereinafter it may also be abbreviated as the SiH-containing compound) as long as it contains at least two hydrosilyl groups in its molecule. For example, publicly known resinoid having linear, cyclic, branched, or three dimensional net-like structure, and the like, may be used.

The SiH-containing compound (B-2) may be exemplified by the SiH-containing compounds disclosed in the paragraphs 0070 to 0081 of the Japanese Patent Laid-Open Publication No. 2001-031809.

The SiH-containing compound (B-2) is usually used in an amount of 0.1 to 100 parts by weight, preferably 0.1 to 75 pats by weight, more preferably 0.1 to 50 parts by weight, further more preferably 0.2 to 30 parts by weight, far more preferably 0.2 to 20 parts by weight, particularly preferably 0.5 to 10 parts by weight, and the most preferably 0.5 to 5 parts by weight, relative to 100 parts by weight of the polyolefin polymer containing vinyl groups at both ends thereof.

When the used amount of the SiH-containing compound (B-2) is within the range described above, a crosslinkable resin composition having excellent mechanical characteristics in the compression set, the elongation, the strength, and the like may be obtained. The used amount exceeding the upper limits causes economically disadvantageous, thus tends to be unpreferable.

Further, the ratio of the SiH group in the SiH-containing compound (B-2) to the aliphatic unsaturated groups involved in the cross-linking in the polyolefin polymer containing vinyl groups at both ends thereof (SiH group/aliphatic unsaturated group) is preferably 0.2 to 20, more preferably 0.5 to 10, and further more preferably 0.7 to 5.

In the reaction of the polyolefin polymer containing vinyl groups at both ends thereof or the thermoplastic resin composition of the present invention with the SiH-containing compound, a catalyst is used when necessary. This catalyst is not particularly restricted as long as it is an addition reaction catalyst and accelerates the addition reaction (a hydrosilylation reaction of an alkene group) of the alkenyl group such as a vinyl group and the like contained in the polyolefin polymer containing vinyl groups at both ends thereof with the SiH group in the SiH-containing compound.

The catalyst may be exemplified by an addition reaction catalyst composed of a platinum group element such as a platinum catalyst, a palladium catalyst, a rhodium catalyst, and the like (a Group 8 metal catalyst such as a Group 8 metal in the periodical table, a metal complex of Group 8, a metal compound of Group 8, and the like). Among these catalysts, a platinum catalyst is preferable. The platinum catalyst may be exemplified by the catalyst disclosed in the paragraphs 0085 to 0088 of the Japanese Patent Laid-Open Publication No. 2001-031809.

[Organic Peroxide (B-3)]

The organic peroxide (B-3) is not particularly restricted as long as it can crosslink at least part of the polymer or the thermoplastic resin composition of the present invention.

The organic peroxide (B-3) may be exemplified by the dialkyl peroxides such as dicumyl peroxide, di-t-butyl peroxide, di-t-butylperoxy-3,3,5-trimethylcyclohexane, t-butyl cumyl peroxide, di-t-amyl peroxide, t-butyl hydroperoxide, 2,5-dimethyl-2,5-di(t-butylperoxy)hexyne-3, 2,5-dimethyl-2,5-di(benzoylperoxy)hexane, 2,5-dimethyl-2,5-di(t-butylperoxy)hexane, α,α'-bis(t-butylperoxy-m-isopropyl)benzene, and the like; the peroxy esters such as t-butylperoxy acetate, t-butylperoxy isobutyrate, t-butylperoxy pivalate, t-butylperoxy maleate, t-butylperoxy neodecanoate, t-butylperoxy benzoate, di-t-butylperoxy phthalate, and the like; and the ketone peroxides such as dicyclohexanone peroxide and the like.

Among these organic peroxides, dicumyl peroxide, di-t-butyl peroxide, di-t-butylperoxy-3,3,5-trimethylcyclohexane, t-butyl cumyl peroxide, di-t-amyl peroxide, t-butyl hydroperoxide, and the like are preferable.

The organic peroxides (B-3) may be used alone or in a mixture of two or more kinds. The amount of the organic peroxide (B-3) is preferably used in an amount of 0.05 to 15 parts by weight relative to 100 parts by weight of the polyolefin polymer containing vinyl groups at both ends thereof.

[Other Components]

The thermoplastic resin compositions or the crosslinkable resin compositions in the present invention may further contain an additive according to its use and the like in a range where the objects of the present invention are not impaired.

The additive may be exemplified by a reaction controlling agent, a silane coupling agent, a plasticizer, a rubber reinforcing agent, an inorganic filler, a softener, an antiaging agent, a process aid, a vulcanization accelerator, a crosslinking aid, a blowing agent, a blowing aid, a coloring agent, a dispersant, a flame-retardant, and the like.

(1) Reaction Controlling Agent

The reaction controlling agent may be exemplified by benzotriazole, an ethynyl-containing alcohol (for example ethynyl cyclohexanol, and the like), acrylonitrile, an amide compound (for example N,N-diallyl acetamide, N,N-diallyl benzamide, N,N,N',N'-tetraallyl-o-phthalic diamide, N,N,N',N'-tetraallyl-m-phthalic diamide, N,N,N',N'-tetraallyl-p-phthalic diamide, and the like), sulfur, phosphorous, nitrogen, an amine compound, a sulfur compound, a phosphorous compound, tin, a tin compound, tetramethyl tetravinylcyclotetrasiloxane, and the like.

The reaction controlling agent is used in an amount of 0 to 50 parts by weight, usually 0.0001 to 50 parts by weight, preferably 0.001 to 30 parts by weight, more preferably 0.005 to 20 parts by weight, further more preferably 0.01 to 10 parts by weight, and particularly preferably 0.05 to 5 parts by weight relative to 100 parts by weight of the polyolefin polymer containing vinyl groups at both ends thereof. When the reaction controlling agent is used in an amount of 50 parts by weight or less, the crosslinking rate is so rapid as to give a rubber composition having excellent productivity of a crosslinked article. Use of the reaction controlling agent in an amount of more than 50 parts by weight is unpreferable because of the disadvantage in the cost.

(2) Silane Coupling Agent

The thermoplastic resin composition or the crosslinkable resin composition of the present invention may contain a silane coupling agent in order to improve self-adhesion properties. The silane coupling agent may be exemplified by an acryl-functional (methacryl-functional) silane coupling agent, an epoxy-functional silane coupling agent, an amino-functional (imino-functional) silane coupling agent, and the like. The silane coupling agent is used in an amount of preferably 0.01 to 10 parts by weight and more preferably 0.1 to 5 parts by weight relative to 100 parts by weight of the sum of the polyolefin polymer containing vinyl groups at both ends thereof and the SiH-containing compound (B-2) that is optionally contained.

(3) Plasticizer

The plasticizer may be exemplified by a petroleum-type softening agent such as a paraffin-type process oil, a naphthene-type process oil, an aromatic-type process oil, a co-oligomer of ethylene and α-olefin, a paraffin wax, a fluidized paraffin, a white oil, a petrolatum, a lubricant oil, a petroleum asphalt, vaseline and the like, a coal tar-type softening agent such as a coal tar, coal tar pitch and the like, an aliphatic oil-type softening agent such as a castor oil, a linseed oil, a rapeseed oil, a palm oil and the like, a synthetic polymer material such as a tall oil, a petroleum resin, an atactic polypropylene, a cumarone indene resin and the like, a phthalic acid derivative, an, isophthalic acid derivative, a tetrahydrophthalic derivative, an adipic acid derivative, an azelaic acid derivative, a sebacic acid derivative, a dodecanoic acid derivative, a maleic acid derivative, a fumaric acid derivative, a trimellitic acid derivative, a pyromellitic acid derivative, a citric acid derivative, an itaconic acid derivative, an oleic acid derivative, a ricinoleic acid derivative, a stearic acid derivative, a phosphoric acid derivative, a sulfonic acid derivative, a glycerin derivative, a glutaric acid derivative, an epoxy derivative, a glycol derivative, a paraffin derivative, a silicon oil, and the like. Among these plasticizers, a process oil and a paraffin derivative are used preferably, and in particular a paraffin oil is far preferable.

The plasticizer is used in an amount of 0 to 1,000 parts by weight, usually 1 to 1,000 parts by weight, preferably 5 to 800 parts by weight, more preferably 10 to 700 parts by weight, further more preferably 20 to 500 parts by weight, and particularly preferably 30 to 300 parts by weight relative to 100 parts by weight of the polyolefin polymer containing vinyl groups at both ends thereof. The plasticizer used in the range described above improves the fluidity and thus moldability.

(4) Reinforcing Material

The crosslinkable resin composition or the thermoplastic resin composition of the present invention may further contain a reinforcing agent. Such a reinforcing agent may improve the mechanical properties such as a tensile strength, a tearing strength, an abrasion resistance and the like, of a crosslinked product prepared from the crosslinkable composition and a molded article of the thermoplastic resin composition. The reinforcing agent may be exemplified by carbon black such as SRF, GPF, FEF, HAF, ISAF, SAF, FT, MT and the like, these carbon blacks whose surface is treated with a silane coupling agent and the like, finely pulverized silicic acid powders, silica, and the like. The silica may be exemplified by a fumed silica, a precipitated silica and the like. These silicas may be surface-treated by a reactive silane such as hexamethyldisilazane, chlorosilane, alkoxysilane and the like, or by a low-molecular weight siloxane and the like. The specific surface area of these silica (by a BED method) is preferably 50 $m^2/g$ or more, and more preferably 100 to 400 $m^2/g$.

The amount of the reinforcing agent to be used may be appropriately selected depending on its use, and is usually 300 parts by weight at maximum and preferably 200 parts by weight at maximum relative to 100 parts by weight of the polyolefin polymer containing vinyl groups at both ends thereof.

(5) Inorganic Filler

The inorganic filler may be exemplified by light calcium carbonate, heavy calcium carbonate, talc, clay, and the like. The amount of the inorganic filler to be used may be appropriately selected depending on its use, and is usually 300 parts by weight at maximum and preferably 200 parts by weight at maximum relative to 100 parts by weight of the polyolefin polymer containing vinyl groups at both ends thereof.

(6) Anti-Aging Agent

The anti-aging agent may be exemplified by publicly known anti-aging agents such as an amine-type, a hindered phenol type, or a sulfur type, and the like. These may be used without any particular restrictions.

The amine-type anti-aging agent may be exemplified by 4,4'-(α,α-dimethylbenzyl)diphenylamine, N,N'-di-2-naphthyl-p-phenylenediamine, and the like.

The hindered phenol-type anti-aging agent is not particularly restricted, but it may be exemplified by tetrakis-[methylene-3-(3',5'-di-t-butyl-4'-hydroxyphenyl) propionate] methane, 3,9-bis[2-{3-(3-t-butyl-4-hydroxy-5-methylphenyl)propionyloxy}-1,1-dimethylethyl]-2,4,8,10-tetraoxaspiro[5,5]undecane, 2,2'-methylene-bis-(4-methyl-6-t-butylphenol), and the like.

The sulfur-type anti-aging agent may be exemplified by 2-mercaptobenzoimidazole, a zinc salt of 2-mercaptobenzoimidazole, 2-mercaptomethyl benzoimidazole, a zinc salt of 2-mercaptomethyl benzoimidazole, pentaerythritol-tetrakis-(β-lauryl-thiopropionate), and the like.

(7) Process Aid

The process aid may be exemplified by a higher fatty acid such as a ricinoleic acid, a stearic acid, a palmitic acid, a lauric acid, and the like; a salt of a higher fatty acid such as barium stearate, zinc stearate, calcium stearate, and the like; and esters of a higher fatty acid such as a ricinoleic acid, a stearic acid, a palmitic acid, a lauric acid, and the like.

The amount of the process aid to be used may be appropriately selected depending on the required physical properties, and is usually 10 parts by weight or less and preferably 5 parts by weight or less relative to 100 parts by weight of the polyolefin polymer containing vinyl groups at both ends thereof.

(8) Crosslinking Aid

In the crosslinkable resin composition of the present invention, a crosslinking aid may be used when the organic peroxide (B-3) is used. The crosslinking aid may be exemplified by a quinone dioxime compound such as p-quinone dioxime and the like; a methacrylate compound such as polyethyleneglycol dimethacrylate and the like; an allyl compound such as diallyl phthalate, triallyl cyanurate, and the like; a maleimide compound; divinylbenzene; and others.

The crosslinking aid is used usually in an amount of 0.5 to 2 moles, and preferably in an approximately equal mole relative to 1 mole of the organic peroxide (B-3) to be used.

[Production Method of the Thermoplastic Resin Composition and the Crosslinkable Resin Composition]

The thermoplastic resin composition of the present invention may be prepared by kneading the polyolefin polymer containing vinyl groups at both ends thereof of the present invention, the thermoplastic resin (A), and other components that are added as necessary.

In addition, the crosslinkable resin composition of the present invention may be prepared by kneading the polyolefin polymer containing vinyl groups at both ends thereof of the present invention or the thermoplastic resin, the crosslinking agent, and other components that are added as necessary.

The kneading equipment usable may be exemplified by a planetary mixer, a kneader, and other publicly known kneading equipment.

The time and the temperature of the kneading may be appropriately selected depending on the resin to be used, a kind of the crosslinking agent, and the like.

[Molded Article, Crosslinked Composition, Crosslinked Product, and Multilayered Laminate]

From the thermoplastic resin composition and the crosslinkable resin composition obtained as mentioned above, a molded article having a desired shape may be produced by various kinds of molding equipment. The molding equipment may be exemplified by an extrusion molder, a calender roll, a press, an injection molder, a transfer molder, and the like. The conditions for the molding may be appropriately selected depending on the resins to be used, the kinds of the crosslinking agent, and the like.

The thermoplastic resin composition or the crosslinkable resin composition obtained as mentioned above may be kneaded further with the thermoplastic resin (A) or the thermoplastic resin composition of the present invention to prepare a new composition, and then the new composition may be molded.

When the crosslinked product or the crosslinked composition is produced from the crosslinkable composition of the present invention, the crosslinkable resin composition is molded into an article having a desired shape by the methods described above and the like, and is then crosslinked at room temperature or under heated conditions. The crosslinking conditions may be appropriately selected depending on the polymers to be used, the kinds of the crosslinking agent, the physical properties required for the crosslinked product or the crosslinked composition to be obtained, and the like.

Furthermore, the thermoplastic resin composition and the crosslinkable resin composition of the present invention may also be used as a filling material, or an adhesive, a coating material, or a potting material.

According to the methods described in the above, the molded article, the crosslinked product, and the crosslinked composition of the present invention may be produced. In addition, a multilayered laminate may also be produced by molding the thermoplastic resin composition or the crosslinkable resin composition of the present invention into a sheet or a film shape, and then by laminating them with other sheet or film.

The multilayered laminate of the present invention is a laminate composed of at least one layer formed from the composition which contains the polyolefin polymer containing vinyl groups at both ends thereof of the present invention. The specific examples of the laminate include a multilayered film, a multilayered sheet, a multilayered vessel, a multilayered tube, a multilayered coated film laminate containing a water-type coating material as a composition component, and the like.

[Modification]

The polyolefin polymer modified by the vinyl groups at both ends thereof of the present invention may be modified in various ways as it has the double bonds at both ends. For example, the double bond may be modified by a peroxide for epoxidation to introduce a high reactive epoxy group into the polymer. The modified polyolefin polymer whose terminals are introduced by the epoxy group may also be used as a thermosetting resin or a reactive resin. Further, by reacting a polar group-containing compound or a polymer body with the polyolefin polymer modified by the vinyl groups at both ends thereof of the present invention, a block olefin polymer is obtained. In addition, by reacting a metal alkoxide such as an alkoxy silane, an alkoxy titanium, or the like, with the polyolefin polymer modified by the vinyl groups at both ends thereof of the present invention, a block olefin polymer is obtained. Moreover, a block polyolefin copolymer may be obtained by copolymerizing with an α-olefin having 2 to 20 carbon atoms by using the polyolefin polymer containing vinyl groups at both ends thereof of the present invention as a macromer.

Furthermore, the vinyl groups contained in the polyolefin polymer containing vinyl groups at both ends thereof of the present invention may also be used for a chemical reaction such as a Diels-Alder reaction, a Michael addition reaction, and the like.

Here, when there is the double bond inside the main chain of the polyolefin polymer containing vinyl groups at both ends thereof of the present invention, the double bond may be selectively hydrogenated to further improve the heat resistance and the ozone resistance.

[Graft Modification]

The polyolefin polymer containing vinyl groups at both ends thereof of the present invention may also be graft-modified partly or entirely by a monomer such as an unsaturated carboxylic acid, a derivative of the unsaturated carboxylic acid, an aromatic vinyl compound, or the like. The amount of the graft-modification is preferably 0.01 to 30% by weight relative to the obtained graft-modified polyolefin polymer containing vinyl groups at both ends thereof of the present invention.

Because the polyolefin polymer containing vinyl bonds at both ends thereof of the present invention contains double bond, the amount of a radical initiator to be used for the modification may be reduced. In a usual polyolefin resin, there may be no double bond in some cases. In such resin with no double bond, the radical generated only by the hydrogen abstraction becomes the initiation point of the grafting reaction. In addition, because all of the radical initiators do not necessarily induce the hydrogen abstraction, a large quantity of the initiator is required. Further, the radical initiator concurrently induces the decomposition reaction of the polyolefin resin, and generally there is a tendency to decrease the molecular weight.

On the other hand, in the polyolefin polymer containing vinyl groups at both ends thereof of the present invention, the generated radicals react with the vinyl groups in the polymer, therefore, the decomposition reaction is suppressed, and thus the decrease of the molecular weight is also suppressed.

The monomer used for the graft modification may be exemplified by an unsaturated carboxylic acid, a derivative of the unsaturated carboxylic acid, an aromatic vinyl compound, and the like.

The unsaturated carboxylic acid may be exemplified by an acrylic acid, a methacrylic acid, a maleic acid, a fumaric acid, an itaconic acid, and the like.

The derivative of the unsaturated carboxylic acid may be exemplified by an unsaturated carboxylic acid anhydride such as a maleic anhydride, a citraconic anhydride, an itaconic anhydride, and the like; an unsaturated carboxylate ester such as methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate, diethyl itaconate, and the like; an unsaturated carboxylic amide such as an acrylamide, a methacrylamide, a maleic acid monoamide, a maleic acid diamide, a maleic acid-N-monoethylamide, a maleic acid-N,N-diethylamide, a maleic acid-N-monobutylamide, a maleic acid-N,N-dibutylamide, a fumaric acid monoamide, a fumaric acid diamide, a fumaric acid-N-monoethylamide, a fumaric acid-N,N-diethylamide, a fumaric acid-N-monobutylamide, a fumaric acid-N,N-dibutylamide, and the like; an unsaturated carboxylic imide such as a maleimide, an N-butyl maleimide, an N-phenyl maleimide, and the like; a metal salt of an unsaturated carboxylic acid such as sodium acrylate, sodium methacrylate, potassium acrylate, potassium methacrylate, and the like; and others.

Among these monomers to be used for the graft modification, maleic anhydride is preferable.

The aromatic vinyl compound may be exemplified by a styrene, a mono- or di-styrene such as o-methylstyrene, m-methylstyrene, p-methylstyrene, o,p-dimethylstyrene, o-ethylstyrene, m-ethylstyrene, p-ethylstyrene, and the like; a functional group-containing styrene derivative such as methoxystyrene, ethoxystyrene, vinyl benzoic acid, methyl vinyl benzoate, vinyl benzyl acetate, hydroxystyrene, o-chlorostyrene, p-chlorostyrene, divinyl benzene, and the like; 3-phenylpropylene; 4-phenylbutene; α-methylstyrene; and others. Among these aromatic vinyl compounds, styrene and 4-methoxystyrene are preferable.

The method for producing the graft-modified copolymer by graft-modificating the polyolefin polymer containing vinyl groups at both ends thereof of the present invention with the monomer is not particularly restricted as long as the graft-modification is performed, but may be exemplified by a method in which the polyolefin polymer containing vinyl groups at both ends thereof and the monomer are added with a radical initiator as necessary in the presence or absence of a solvent and heated at high temperature to perform the graft-modification, and other publicly known methods.

In the following sentences, one suitable method is described for industrially producing the graft-modified polyolefin polymer containing vinyl groups at both ends thereof whose grafting rate is 0.01 to 30% by weight relative to the obtained graft-modified polyolefin polymer containing vinyl groups at both ends thereof and also whose part of or all of the vinyl groups at the ends are reacted with the monomer. First, a graft-modified polyolefin polymer containing vinyl groups at both ends thereof having high grafting rate is produced and then this graft-modified polyolefin polymer containing vinyl groups at both ends thereof is mixed with the unmodified polyolefin polymer containing vinyl groups at both ends thereof to obtain a polymer having the desired grafting rate.

Here, when the graft-modified polyolefin polymer containing vinyl groups at both ends thereof is produced, the monomer in an amount corresponding to the desired modification amount may be preliminary blended with the polyolefin polymer containing vinyl groups at both ends thereof, and thereafter the grafting reaction may be carried out.

The amount of the modification of the polyolefin polymer containing vinyl groups at both ends thereof by the monomer is preferably 0.01 to 30% by weight and more preferably 0.05 to 10% by weight relative to the obtained graft-modified polyolefin polymer containing vinyl groups at both ends thereof.

APPLICATION

The polymer and the composition of the present invention suitably have applications including a sealing material, a coating material, a potting material, an adhesive and the like.

A sealing material means a material in order to seal up (seal off, tightly seal). Accordingly, materials used to seal up a connecting part and a contacting part from water or air in various kinds of industries such as mechanical industries, electrical industries, chemical industries and the like is also the sealing material in a broad sense. The sealing material may be in the form of paste or shaped (refer to page 141 of "Sealing Material for Architecture, Fundamentals and Proper Use", first edition, Japan Sealing Material Industry Association, Koubunsha Co., Ltd.). The sealing material is suitably used as the sealing material in a refrigerator, a freezer, a washing machine, a gas meter, a microwave oven, a steam iron, and a breaker for electric leakage.

A coating material is suitably used for coating a thick film resistor for high voltage or various circuit elements such as hybrid IC and the like, an HIC, an electrical insulation component, a semi-conductive component, a conductive component, a module, a printing circuit, a ceramic substrate, a diode, a buffering material for a transistor or a bonding wire and the like, a semi-conductive element, or an optical fiber for optical communication.

A potting material is suitably used for potting a transformer high-voltage circuit, a printing substrate, a high-voltage transformer having a variable resistor, an electrical insulation component, a semi-conductive component, a conductive component, a solar cell, or a flyback transformer for a television.

An adhesive is suitably used in order to bond a Braun tube wedge, a neck, an electrical insulation component, a semi-conductive component, or a conductive component.

Other applications include a mending material for an electric wire covering, an insulation seal material for an electric wire joint component, a roll for an office automation equipment, a vibration damping material, a potting material for a gel or a condenser, and the like.

The polymer and the composition of the present invention are used for an automobile, a ship, an aircraft, or a railway vehicle in a field of the transportation.

In the automobile application, there may be mentioned a gasket of an automobile engine, a sealing material for an electrical component or an oil filter, a potting material for an igniter HIC or an automobile hybrid IC, an automobile body, an automobile window glass, a coating material for an engine control substrate, a gasket for an oil pan, a timing belt cover or the like, a mole, a head lamp lens, a sunroof seal, an adhesive for a mirror, and others.

In the application of a ship, there may be mentioned a sealing material for a branching box for an electric wire connection, an electrical component or an electric wire, and an adhesive for an electric wire and a glass, and others.

In the application of civil engineering and construction, there may be mentioned an construction sealant used for a joint for a glass screen construction of a commercial building, a joint between a sash and a glass, an interior joint for a toilet, a bathroom, a show case or the like, a joint around a bath tub, an expansion and contraction joint for an outer wall of a prefabricated house, a joint of a sizing board; a sealing material for a paired glass; a sealant for civil work used in road maintenance; a coating and adhesive for a metal, a glass, a stone, a slate, a concrete, or a roof tile; an adhesive sheet, a water-proof sheet or a anti-shock sheet; and the like.

In the medical application, there may be mentioned a rubber plug for medical purpose, a syringe gasket, a rubber plug for a reduced pressure blood vessel, and the like.

In the leisure application, there may be mentioned a swimming goods such as a swimming cap, a diving mask, ear plugs and the like, a gel buffering material of a sport shoes, a base ball glove and the like, and others.

EXAMPLES

Hereinafter, the present invention will be explained specifically by Examples, but the present invention is not limited by these Examples at all.

The composition, the intrinsic viscosity $[\eta]$, the terminal vinylation ratio, the stereoregularity, and the tensile characteristics of the polyolefin copolymer containing vinyl groups at both ends thereof prepared in the synthetic examples were obtained by the following methods.

1) Composition: this was measured by $^{13}$C-NMR.

2) Intrinsic viscosity $[\eta]$: this was measured in a Decalin® solution at 135° C.

3) Terminal vinylation ratio: firstly the numbers of the terminal vinyl groups and the vinyl groups having the 1,2-addition structure formed by the metathesis reaction were measured by $^1$H-NMR, and the numbers per 1000 carbons were obtained. Then the number-average molecular weight (Mn) was obtained by the GPC measurement (the GPC measurements were performed in the o-dichlorobenzene solvent by using GMH-HT and GMH-HTL columns manufactured by Tosoh Corp.), from which the numbers of the total terminals were calculated and then the terminal vinylation ratio were calculated. Here, when the content of ethylene is more than 50% by mole, the measurement result was converted to the number-average molecular weight relative to polyethylene molecular weight. On the other hand, when the content of propylene is more than 50% by mole, the measurement result was converted to the number-average molecular weight relative to polypropylene molecular weight.

4) Stereoregularity: The mesotriad fraction (mm) and the racemotriad fraction (rr) were measured by $^{13}$C-NMR. The details are the same as those described in the above.

5) Tensile test: the tensile test was performed in accordance with JIS K-6251 at the measurement temperature of 23° C. and the pulling rate of 500 mm/minute to measure the tensile strength TB and the tensile elongation EB at the time of sheet breakage.

Example 1

Synthesis of ethylene/propylene/1,3-butadiene Copolymer

Into a 2000-mL polymerization vessel thoroughly purged with a nitrogen gas, 875 mL of dry hexane, 16 g of 1,3-butadiene, and 0.3 mmol of triisobutyl aluminum were charged at room temperature, and then the inner temperature of the polymerization vessel was raised to 70° C. Then, the inside of the vessel was pressurized to 0.2 MPa with propylene, and then to 0.6 MPa with ethylene. Subsequently, 4.8 mmol, as Al metal, of a methyl alumoxane in toluene and 0.008 mmol of [dimethyl(t-butylamide)(tetramethyl-$\eta^5$-cyclopentadienyl)silane]titanium dichloride were charged into the polymerization vessel, and the polymerization was carried out for 10 minutes while maintaining the ethylene pressure at 0.6 MPa and the inner temperature at 70° C. Then, 20 mL of methanol was added to terminate the polymerization. After depressurized, the polymer was recovered from the polymerization solution by precipitation in 2 L of methanol, and then dried at 130° C. for 12 hours under vacuum. The yield of the obtained polyolefin copolymer was 37.7 g. In the composition of the copolymer, the content of ethylene was 77.7% by mole, the content of propylene was 17.0% by mole, and the content of 1,3-butadiene was 5.3% by mole. The content of 1,3-butadiene contained 2.0% by mole of 1,4-addition structure, 0.2% by mole of 1,2-addition structure, 2.3% by mole of 5-membered ring structure, and 0.2% by mole of 3-membered ring structure. The intrinsic viscosity $[\eta]$ of the copolymer was 1.78 dL/g.

Next, 5 g of the obtained polyolefin copolymer and 750 mL of dried toluene were charged into a 2000-mL SUS autoclave thoroughly purged with a nitrogen gas, and then, after the inner temperature of the autoclave was raised to 80° C., the mixture was agitated for 2 hours to dissolve the polyolefin copolymer. Thereafter, the inside of the polymerization vessel was pressurized to 0.8 MPa with ethylene. Then, a toluene solution containing 0.75 mmol of tungsten hexachloride, 7.5 mmol of propyl acetate, and 1.5 mmol of tetramethyl tin was charged into the autoclave, and the reaction was carried out for 60 minutes while maintaining the ethylene pressure at 0.8 MPa and the inner temperature at 80° C. Thereafter, 20 mL of methanol was added to terminate the reaction. After depressurized, the obtained reaction solution was passed through a column packed with 100 g of silica gel, and then the polymer was recovered from the reaction solution by precipitation in 4 L of methanol, and dried at 130° C. for 12 hours under vacuum. The yield of the obtained polyolefin polymer containing vinyl groups at both ends thereof was 3.9 g. In the composition of the polymer, the content of ethylene was 79.8% by mole, the content of propylene was 16.6% by mole, and the content of 1,3-butadiene was 3.6% by mole. The content of 1,3-butadiene contained 0.6% by mole of 1,4-addition structure, 0.5% by mole of 1,2-addition structure, 2.3% by mole of 5-membered ring structure, and 0.2% by mole of 3-membered ring structure. The terminal vinylation ratio of the polymer was 77%, and the intrinsic viscosity $[\eta]$ was 0.12 dL/g.

100 parts by weight of the obtained polyolefin polymer containing vinyl groups at both ends thereof, 4.3 parts by weight of $C_6H_5Si(\text{—OSiMe}_2H)_3$ (manufactured by Shin-Etsu Chemical Co., Ltd.), and 0.3 part by weight of 2% isopropyl alcohol (IPA) solution of chloroplatinate were kneaded by a laboratory plastomill at room temperature to obtain a blended material. The blended material thus obtained was poured into a 2-mm depth mold and was allowed to stand at room temperature for 3 days to obtain a 2-mm thickness crosslinked sheet. The tensile strength test of the crosslinked sheet thus obtained was performed. The evaluation results are shown in Table 1.

Example 2

Synthesis of ethylene/propylene/1,3-butadiene Copolymer

A polyolefin copolymer was obtained in the same manner as that of Example 1 except for changing the amount of 1,3 butadiene to 10.0 g, the polymerization temperature to 30° C., and the polymerization time to 20 minutes. The yield of the obtained polyolefin copolymer was 17.7 g. In the composition of the copolymer, the content of ethylene was 64.2% by mole, the content of propylene was 31.9% by mole, and the content of 1,3-butadiene was 3.8% by mole. The intrinsic viscosity [η] of the copolymer was 2.30 dL/g.

Next, the polyolefin copolymer was reacted with ethylene in the same manner as that of Example 1. The yield of the obtained polyolefin polymer containing vinyl groups at both ends thereof was 4.0 g. In the composition of the polymer, the content of ethylene was 67.3% by mole. The terminal vinylation ratio of the polymer was 82% and the intrinsic viscosity [q] was 0.24 dL/g.

A blended material and a crosslinked sheet were obtained in the same manner as that of Example 1 except that 50 parts by weight of a plasticizer Idemitsu Diana Process Oil PW-32 (manufactured by Idemitsu Kosan Co., Ltd.) was further added to the obtained polyolefin polymer containing vinyl groups at both ends thereof. The tensile strength test of the crosslinked sheet thus obtained was performed. The evaluation results are shown in Table 1.

Example 3

Synthesis of ethylene/TD/1,3-butadiene Copolymer

Into a 2000-mL polymerization vessel thoroughly purged with a nitrogen gas, 218 mL of dry hexane, 77 mL of dried tetracyclo[4.4.0.1$^{2,5}$.1$^{7,10}$]-3-dodecene (hereinafter abbreviated as TD), 3.0 g of 1,3-butadiene, and 0.3 mmol of triisobutyl aluminum were charged at room temperature, and then the inner temperature of the polymerization vessel was raised to 50° C. Then, the inside of the polymerization vessel was pressurized to 0.6 MPa with ethylene. Subsequently, 2.55 mmol, as Al metal, of a methyl alumoxane in toluene and 0.0037 mmol of dimethylmethylene bisindenylzirconium dichloride in toluene were charged into the polymerization vessel, and the polymerization was carried out for 60 minutes while maintaining the inner temperature at 50° C. and the ethylene pressure at 0.6 MPa. Then, 20 mL of methanol was added to terminate the polymerization. After depressurized, the polymer was recovered from the polymerization solution by precipitation in 2 L of methanol, and then dried at 130° C. for 12 hours under vacuum. The yield of the obtained polyolefin copolymer was 18.3 g. In the composition of the copolymer, the content of ethylene was 67.8% by mole, the content of cyclotetradodecene was 30.7% by mole, and the content of 1,3-butadiene was 1.5% by mole. The intrinsic viscosity [η] of the copolymer was 0.95 dL/g.

Next, the polyolefin copolymer was reacted with ethylene in the same manner as that of Example 1. The yield of the obtained polyolefin polymer containing vinyl groups at both ends thereof was 4.3 g. In the composition of the polymer, the content of ethylene was 69.5% by mole. The terminal vinylation ratio of the polymer was 72% and the intrinsic viscosity [η] was 0.25 dL/g.

A blended material and a crosslinked sheet were obtained from the obtained polyolefin polymer containing vinyl groups at both ends thereof in the same manner as that of Example 1. The tensile strength test of the crosslinked sheet thus obtained was performed. The evaluation results are shown in Table 1.

Example 4

Synthesis of isoPP/1,3-butadiene Copolymer

Into a 2000-mL polymerization vessel thoroughly purged with a nitrogen gas, 885 mL of dry hexane, 10.0 g of 1,3-butadiene, and 1.0 mmol of triisobutyl aluminum were charged at room temperature, and then the inner temperature of the polymerization vessel was raised to 50° C. Then, the inside of the polymerization vessel was pressurized to 0.7 MPa with propylene. Subsequently, 3-mL of a toluene solution obtained by contacting in advance 0.6 mmol, as Al metal, of a methyl alumoxane in toluene and 0.002 mmol of diphenylmethylene(3-tert-butyl-5-methylcyclopentadienyl)-2,7-di-tert-butylfluorenylzirconium dichloride (MM-437) for 30 minutes was charged into the polymerization vessel, and the polymerization was carried out for 30 minutes while maintaining the inner temperature at 50° C. and the propylene pressure at 0.7 MPa. Then, 20 mL of methanol was added to terminate the polymerization. After depressurized, the polymer was recovered from the polymerization solution by precipitation in 2 L of methanol, and then dried at 130° C. for 12 hours under vacuum. The yield of the obtained polyolefin copolymer was 22.1 g. In the composition of the copolymer, the content of propylene was 97.5% by mole and the content of 1,3-butadiene was 2.5% by mole. The 5-membered ring structure and the 3-membered ring structure were not detected. The intrinsic viscosity [η] of the copolymer was 2.45 dL/g.

Next, the polyolefin copolymer was reacted with ethylene in a similar manner to that of Example 1. The yield of the obtained polyolefin polymer containing vinyl groups at both ends thereof was 4.2 g. In the composition of the polymer, the content of propylene was 96.5% by mole. The terminal vinylation ratio of the polymer was 73% and the intrinsic viscosity [η] was 0.32 dL/g. The stereoregularity of the polymer showed the mesotriad fraction of 90% and the racemotriad fraction of 3%.

A blended material and a crosslinked sheet were obtained in the same manner as that of Example 1 except that 30 parts by weight of a plasticizer PW-32 was further added to the obtained polyolefin polymer containing vinyl groups at both ends thereof. The tensile strength test of the crosslinked sheet thus obtained was performed. The evaluation results are shown in Table 1.

Example 5

Synthesis of synPP/1,3-butadiene Copolymer

Into a 2000-mL polymerization vessel thoroughly purged with a nitrogen gas, 885 mL of dry hexane, 5.0 g of 1,3-butadiene, and 1.0 mmol of triisobutyl aluminum were charged at room temperature, and then the inner temperature of the polymerization vessel was raised to 50° C. Then, the inside of the polymerization vessel was pressurized to 0.7 MPa with propylene. Subsequently, 3-mL of a toluene solution obtained by contacting in advance 1.5 mmol, as Al metal, of a methyl alumoxane in toluene and 0.005 mmol of diphenylmethylene cyclopentadienyl fluorenyl zirconium dichloride (MC-6) for 30 minutes was charged into the polymerization vessel, and the polymerization was carried out for 30 minutes while maintaining the inner temperature at 50° C. and the propylene pressure at 0.7 MPa. Then, 20 mL of methanol was added to terminate the polymerization. After depressurized, the polymer was recovered from the polymerization solution by precipitation in 2 L of methanol, and then dried at 130° C. for 12 hours under vacuum. The yield of the obtained polyolefin copolymer was 21.5 g. In the composition of the copolymer, the content of propylene was 97.8% by mole. The intrinsic viscosity [η] of the copolymer was 2.50 dL/g.

Next, the polyolefin copolymer was reacted with ethylene in a similar manner to that of Example 1. The yield of the obtained polyolefin polymer containing vinyl groups at both ends thereof was 4.1 g. In the composition of the polymer, the content of propylene was 97.1% by mole. The terminal vinylation ratio of the polymer was 72% and the intrinsic viscosity [η] was 0.34 dL/g. The stereoregularity of the polymer showed the mesotriad fraction of 10% and the racemotriad fraction of 70%.

A blended material and a crosslinked sheet were obtained in the same manner as that of Example 1 except that 30 parts by weight of a plasticizer PW-32 was further added to the obtained polyolefin polymer containing vinyl groups at both ends thereof. The tensile strength test of the crosslinked sheet thus obtained was performed. The evaluation results are shown in Table 1.

Example 6

Synthesis of ataPP/1,3-butadiene Copolymer

Into a 2000-mL polymerization vessel thoroughly purged with a nitrogen gas, 885 mL of dry hexane, 10.0 g of 1,3-butadiene, and 1.0 mmol of triisobutyl aluminum were charged at room temperature, and then the inner temperature of the polymerization vessel was raised to 70° C. Then, the inside of the polymerization vessel was pressurized to 0.7 MPa with propylene. Subsequently, 3-mL of a toluene solution obtained by contacting in advance 1.5 mmol, as Al metal, of a methyl alumoxane in toluene and 0.005 mmol of [dimethyl(t-butylamide)(tetramethyl-5-cyclopentadienyl)silane] titanium dichloride for 30 minutes was charged into the polymerization vessel, and the polymerization was carried out for 30 minutes while maintaining the inner temperature at 70° C. and the propylene pressure at 0.7 MPa. Then, 20 mL of methanol was added to terminate the polymerization. After depressurized, the polymer was recovered from the polymerization solution by precipitation in 2 L of methanol, and then dried at 130° C. for 12 hours under vacuum. The yield of the obtained polyolefin copolymer was 40.3 g. In the composition of the copolymer, the content of propylene was 97.2% by mole. The iodine value of the copolymer was 16.8 g/100 g. The intrinsic viscosity [η] of the copolymer was 2.25 dL/g.

Next, the polyolefin copolymer was reacted with ethylene in a similar manner to that of Example 1. The yield of the obtained polyolefin polymer containing vinyl groups at both ends thereof was 4.0 g. In the composition of the polymer, the content of propylene was 96.6% by mole. The terminal vinylation ratio of the polymer was 72% and the intrinsic viscosity [η] was 0.32 dL/g. The stereoregularity of the polymer showed the mesotriad fraction of 27% and the racemotriad fraction of 33%.

A blended material and a crosslinked sheet were obtained by the same manner as that of Example 1 except that 30 parts by weight of a plasticizer PW-32 was further added to the obtained polyolefin polymer containing vinyl groups at both ends thereof. The tensile strength test of the crosslinked sheet thus obtained was performed. The evaluation results are shown in Table 1.

Comparative Example 1

By using a stainless steel polymerization vessel having the substantial inner volume of 100 L and equipped with agitation blades (the number of agitating revolutions=250 rpm), a continuous copolymerization of 3 different monomers, namely ethylene, propylene, and 5-vinyl-2-norbornene was carried out. Into the liquid phase from the side of the polymerization vessel, hexane at 35.3 L/hour, ethylene at 1.4 kg/hour, propylene at 6.8 kg/hour, 5-vinyl-2-norbornene (VNB) at 170 g/hour, hydrogen gas at 300 NL/hour, a catalyst VO(OEt)Cl$_2$ at 16 mmol/hour, and Al(Et)$_{1.5}$Cl$_{1.5}$ at 112 mmol/hour were continuously charged. The copolymerization was carried out under these conditions to obtain a homogenous reaction solution containing the random copolymer, namely, ethylene-propylene-5-vinyl-2-norbornene copolymer. Thereafter, a small quantity of methanol was added into the polymer solution continuously withdrawn from the bottom part of the polymerization vessel to terminate the polymerization reaction. Then, the copolymer was separated from the solvent by a steam stripping treatment, and then dried at 55° C. for 48 hours under vacuum. The yield of ethylene-propylene-5-vinyl-2-norbornene copolymer thus obtained was 1.5 kg/hour. In the composition of the copolymer, the content of ethylene was 68.3% by mole, the content of propylene was 30.4% by mole, and the content of VNB was 1.3% by mole. The terminal vinylation ratio of the copolymer was 2% and the intrinsic viscosity [η] was 0.28 dL/g.

A blended material and a crosslinked sheet were obtained from the obtained ethylene-propylene-5-vinyl-2-norbornene copolymer in the same manner as that of Example 1. The tensile strength test of the crosslinked sheet thus obtained was performed. The evaluation results are shown in Table 2.

Comparative Example 2

A polyolefin copolymer (ethylene-tetradodecene-5-vinyl-2-norbornene copolymer) was obtained in the same manner as that of Example 3 except that 1.5 mL of VNB was used in place of 3.0 g of 1,3-butadiene and the polymerization temperature was changed to 70° C. The yield of the obtained polyolefin copolymer was 20.1 g. In the composition of the copolymer, the content of ethylene was 70.3% by mole, the content of tetradecene was 28.1% by mole, and the content of VNB was 1.6% by mole. The terminal vinylation ratio of the copolymer was 2% and the intrinsic viscosity [η] was 0.25 dL/g. The number of terminal vinyl group was 0.1/1000C.

A blended material and a crosslinked sheet were obtained from the obtained ethylene-tetradodecene-5-vinyl-2-norbornene copolymer in the same manner as that of Example 1. The tensile strength test of the crosslinked sheet thus obtained was performed. The evaluation results are shown in Table 2.

Comparative Example 3

A polyolefin copolymer (propylene-5-vinyl-2-norbornene copolymer) was obtained in the same manner as that of Example 4 except that 5 mL of VNB was used in place of 10.0 g of 1,3-butadiene and the polymerization temperature was changed to 50° C. The yield of the obtained polyolefin copolymer was 18.5 g. In the composition of the copolymer, the content of propylene was 98.5% by mole and the content of VNB was 1.5% by mole. The terminal vinylation ratio of the copolymer was 0% and the intrinsic viscosity [η] was 0.35 dL/g.

A blended material and a crosslinked sheet were obtained from the obtained propylene-5-vinyl-2-norbornene copolymer in the same manner as that of Example 1. The tensile strength test of the crosslinked sheet thus obtained was performed. The evaluation results are shown in Table 2.

Comparative Example 4

A polyolefin copolymer (propylene-5-vinyl-2-norbornene copolymer) was obtained in the same manner as that of Example 5 except that 5 mL of VNB was used in place of 5.0 g of 1,3-butadiene and the polymerization temperature was changed to 60° C. The yield of the obtained polyolefin copolymer was 15.1 g. The intrinsic viscosity [η] of the copolymer was 2.10 dL/g.

The obtained polyolefin polymer was decomposed by heat at 360° C. for 1 hour under a nitrogen atmosphere.

The intrinsic viscosity of the thermally decomposed polymer thus obtained was 0.33 dL/g. However, the terminal vinyl group was not detected.

A blended material and a crosslinked sheet were obtained, in the same manner as that of Example 4, from the thermally decomposed polymer thus obtained. The tensile strength test of the crosslinked sheet thus obtained was performed. The evaluation results are shown in Table 2.

Comparative Example 5

A polyolefin copolymer (propylene-5-vinyl-2-norbornene copolymer) was obtained in the same manner as that of Example 6 except that 5 mL of VNB was used in place of 10.0 g of 1,3-butadiene and the polymerization temperature was changed to 90° C. The yield of the obtained polyolefin copolymer was 30.1 g. The intrinsic viscosity [η] of the copolymer was 2.00 dL/g.

The obtained polyolefin polymer was decomposed by heat at 360° C. for 1 hour under a nitrogen atmosphere.

The intrinsic viscosity of the thermally decomposed polymer thus obtained was 0.33 dL/g. However, the terminal vinyl group was not detected.

A blended material and a crosslinked sheet were obtained in the same manner as that of Example 4, from the thermally decomposed polymer thus obtained. The tensile strength test of the crosslinked sheet thus obtained was performed. The evaluation results are shown in Table 2.

Comparative Example 6

A polyolefin copolymer (ethylene-propylene-1,3-butadiene copolymer) was obtained in the same manner as that of Example 2 except for adding 30 NL of hydrogen. The yield of the obtained polyolefin copolymer was 19.3 g. The intrinsic viscosity [η] of the copolymer was 1.5 dL/g. In the composition of the copolymer, the content of ethylene was 64.2% by mole, the content of propylene was 31.9% by mole, and the content of 1,3-butadiene was 3.8% by mole.

Next, the polyolefin copolymer was reacted with ethylene in the same manner as that of Example 1 except for changing the reaction time to 30 minutes. The yield of the obtained polyolefin polymer containing vinyl groups at the end thereof was 4.2 g. In the composition of the polymer, the content of ethylene was 67.3% by mole. The terminal vinylation ratio of the polymer was 60% and the intrinsic viscosity [η] was 0.29 dL/g.

A blended material and a crosslinked sheet were obtained in the same manner as that of Comparative Example 1 except that 50 parts by weight of a plasticizer PW-32 was further added to the obtained polyolefin polymer containing vinyl groups. The tensile strength test of the crosslinked sheet thus obtained was performed. The evaluation results are shown in Table 2.

Comparative Example 7

A polyolefin copolymer (ethylene-propylene-1,3-butadiene copolymer) was obtained in the same manner as that of Comparative Example 6 except for changing the addition amount of hydrogen to 100 NL. The yield of the obtained polyolefin copolymer was 20.2 g. The intrinsic viscosity [η] of the copolymer was 0.4 dL/g. In the composition of the copolymer, the content of ethylene was 64.2% by mole, the content of propylene was 31.9% by mole, and the content of 1,3-butadiene was 3.8% by mole.

Next, the polyolefin copolymer was reacted with ethylene in the same manner as that of Example 1 except for changing the reaction time to 15 minutes. The yield of the obtained polyolefin polymer containing vinyl groups at the end thereof was 4.1 g. In the composition of the polymer, the content of ethylene was 67.3% by mole. The terminal vinylation ratio of the polymer was 30% and the intrinsic viscosity [η] was 0.25 dL/g.

A blended material and a crosslinked sheet were obtained in the same manner as that of Comparative Example 1 except that 50 parts by weight of a plasticizer PW-32 was further added to the obtained polyolefin polymer containing vinyl groups at the end thereof. The tensile strength test of the crosslinked sheet thus obtained was performed. The evaluation results are shown in Table 2.

TABLE 1

|  | Example 1 | Example 2 | Example 3 | Example 4 | Example 5 | Example 6 |
| --- | --- | --- | --- | --- | --- | --- |
| Ethylene content (% by mole) | 79.8 | 67.3 | 69.5 | 1.5 | 1.4 | 1.5 |
| Propylene content (% by mole) | 16.6 | 29.7 | — | 96.5 | 97.1 | 96.6 |
| TD content (% by mole) | — | — | 28.4 | — | — | — |
| 1,4-addition structure (% by mole) | 0.6 | 0.4 | 0.1 | 0.3 | 0.2 | 0.4 |
| 1,2-addition structure (% by mole) | 0.5 | 0.4 | 0.4 | 1.7 | 1.3 | 1.5 |
| 5-Membered ring structure (% by mole) | 2.3 | 2.1 | 1.5 | 0 | 0 | 0 |
| 3-Membered ring structure (% by mole) | 0.2 | 0.1 | 0.1 | 0 | 0 | 0 |
| Number of terminal vinyl group (/1000 C) | 9.5 | 4.3 | 3.6 | 1.7 | 2.5 | 2 |
| Terminal vinylation ratio (%) | 77 | 82 | 72 | 73 | 72 | 72 |
| Mesotriad fraction (mm) (%) | — | — | — | 90 | 10 | 27 |

TABLE 1-continued

|  | Example 1 | Example 2 | Example 3 | Example 4 | Example 5 | Example 6 |
|---|---|---|---|---|---|---|
| Racemotriad fraction (rr) (%) | — | — | — | 3 | 70 | 33 |
| Intrinsic viscosity [η] (dl/g) | 0.12 | 0.24 | 0.25 | 0.32 | 0.34 | 0.32 |
| Blend (parts by weight) | | | | | | |
| Polyolefin polymer | | | | 100 | | |
| $C_6H_5Si(\text{—OSiMe}_2H)_3$ | 4.3 | 4.3 | 4.3 | 4.3 | 4.3 | 4.3 |
| 2% Chloroplatinate IPA solution | 0.3 | 0.3 | 0.3 | 0.3 | 0.3 | 0.3 |
| PW-32 | — | 50 | — | 30 | 30 | 30 |
| Evaluation results | | | | | | |
| Tensile strength TB [MPa] | 3.8 | 3.3 | 2800 | 10.1 | 10.2 | 11.8 |
| Tensile elongation EB [%] | 400 | 330 | 20 | 900 | 930 | 1010 |

TABLE 2

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Ethylene content (% by mole) | 68.3 | 70.3 | — | — | — | 67.3 | 67.3 |
| Propylene content (% by mole) | 30.4 | — | 98.5 | 98.6 | 98.3 | 29.7 | 29.7 |
| TD content (% by mole) | — | 28.1 | — | — | — | — | — |
| VNB content (% by mole) | 1.3 | 1.6 | 1.5 | 1.4 | 1.7 | — | — |
| 1,4-addition structure (% by mole) | — | — | — | — | — | 0.7 | 0.4 |
| 1,2-addition structure (% by mole) | — | — | — | — | — | 0.4 | 0.4 |
| 5-Membered ring structure (% by mole) | — | — | — | — | — | 2.1 | 2.1 |
| 3-Membered ring structure (% by mole) | — | — | — | — | — | 0.1 | 0.1 |
| Number of terminal vinyl group (/1000 C) | 0.1 | 0.1 | 0 | 0 | 0 | 2.8 | 1.6 |
| Terminal vinylation ratio (%) | 2 | 2 | 0 | 0 | 0 | 60 | 30 |
| Mesotriad fraction (mm) (%) | — | — | 91 | 12 | 26 | — | — |
| Racemotriad fraction (rr) (%) | — | — | 3 | 71 | 33 | — | — |
| Intrinsic viscosity [η] (dl/g) | 0.28 | 0.25 | 0.35 | 0.33 | 0.33 | 0.29 | 0.25 |
| Blend (parts by weight) | | | | | | | |
| Polyolefin polymer | | | | 100 | | | |
| $C_6H_5Si(\text{—OSiMe}_2H)_3$ | 4.3 | 4.3 | 4.3 | 4.3 | 4.3 | 4.3 | 4.3 |
| 2% Chloroplatinate IPA solution | 0.3 | 0.3 | 0.3 | 0.3 | 0.3 | 0.3 | 0.3 |
| PW-32 | 50 | — | 30 | 30 | 30 | 50 | 50 |
| Evaluation results | | | | | | | |
| Tensile strength TB [MPa] | 0.5 | 1000 | 3.5 | 3.5 | 3.7 | 2 | 0.7 |
| Tensile elongation EB [%] | 100 | 8 | 450 | 480 | 500 | 200 | 140 |

INDUSTRIAL APPLICABILITY

The polyolefin polymer containing vinyl groups at both ends thereof of the present invention is excellent in molding processability and provides a thermoplastic resin composition and a crosslinkable resin composition that contain the polyolefin polymer containing vinyl groups at both ends thereof, and also a crosslinked composition having excellent mechanical characteristics. Further, the polyolefin polymer containing vinyl group at both end thereof of the present invention is excellent in gas permeation resistance, hydrolysis resistance, and dynamic fatigue resistance. Accordingly, the polyolefin polymer containing vinyl groups at both ends thereof and the composition containing thereof, of the present invention, provide a material usable in various fields of an electric and electronic component, a transportation equipment, a civil engineering and construction, an architecture material, a medical, a leisure, a packaging, and the like, or a molded article and a multilayered laminate. Specific applications are those as mentioned before.

The invention claimed is:
1. A polyolefin polymer containing vinyl groups at both ends thereof, containing a constitutional unit derived from at least one selected from the group consisting of an α-olefin having 3 to 20 carbon atoms (b), and a cyclic olefin (c) represented by the following general formula[III];
obtained by metathesis reaction; and having
(1) a ratio of terminal vinylation of 70% or more relative to all of both ends of molecular chains, and

(2) an intrinsic viscosity [η] in the range of 0.01 to 10 dl/g as measured in a decahydronaphthalene solution at 135° C., the α-olefin (b) being a propylene (e) and at least one kind of an α-olefin (f) having 4 to 20 carbon atoms, the constitutional unit derived from the propylene (e) satisfying any one of the following conditions i) to iii)

i) a mesotriad fraction (mm) obtained from $^{13}$C-NMR is 50% or more;
ii) a racemotriad fraction (rr) obtained from $^{13}$C-NMR is 50% or more;
iii) a mesotriad fraction obtained from $^{13}$C-NMR is less than 50% and a racemotriad fraction obtained from $^{13}$C-NMR is less than 50%:

[Formula 3]

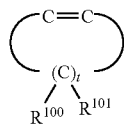

[III]

wherein each of $R^{100}$ and $R^{101}$ may be the same or different and represents a hydrogen atom or a hydrocarbon group having 1 to 5 carbon atoms; and f represents an integer of $1 \leq f \leq 18$.

2. The polyolefin polymer containing vinyl groups at both ends thereof according to claim 1, wherein a constitutional unit derived from polyene (d) represented by the following general formula [IV] is further contained:

[Formula 4]

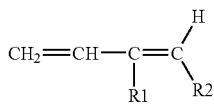

[IV]

wherein each of $R^1$ and $R^2$ may be the same or different and represents a hydrogen atom, and an alkyl group having 1 to 8 carbon atoms or an aryl group, and at least one of $R^1$ and $R^2$ is a hydrogen atom.

3. The polyolefin polymer containing vinyl groups at both ends thereof according to claim 1, wherein constitutional units derived from the α-olefin (b), the cyclic olefin (c), and ethylene (a) are contained, and a ratio of the number of moles a of the constitutional unit derived from the ethylene (a) to the total number of moles b of the constitutional unit derived from the α-olefin (b) and moles c of the constitutional unit derived from the cyclic olefin (c), namely a/(b+c), is in the range of 99/1 to 50/50.

4. The polyolefin polymer containing vinyl groups at both ends thereof according to claim 2, wherein constitutional units derived from the α-olefin (b), the cyclic olefin (c), the polyene (d) and ethylene (a) are contained, and a ratio of the number of moles a of the constitutional unit derived from the ethylene (a) to the total number of moles b of the constitutional unit derived from the α-olefin (b), moles c of the constitutional unit derived from the cyclic olefin (c), and moles d of the constitutional unit derived from the polyene (d), namely a/(b+c+d), is in the range of 99/1 to 50/50.

5. The polyolefin polymer containing vinyl groups at both ends thereof according to claim 1, wherein constitutional units derived from the α-olefin (b), the cyclic olefin (c) and ethylene (a) are contained, constitutional units derived from propylene (e) and an α-olefin (f) having 4 to 20 carbon atoms are contained as the constitutional unit derived from the α-olefin (b), and a ratio of the number of moles e of the constitutional unit derived from the propylene (e) to the total number of moles a of the constitutional unit derived from the ethylene (a), moles f of the constitutional unit derived from the α-olefin (f) having 4 to 20 carbon atoms, and moles c of the constitutional unit derived from the cyclic olefin (c), namely e/(a+f+c), is in the range of 99/1 to 50/50.

6. The polyolefin polymer containing vinyl groups at both ends thereof according to claim 2, wherein constitutional units derived from the α-olefin (b), the cyclic olefin (c), the polyene (d) and ethylene (a) are contained, constitutional units derived from propylene (e) and an α-olefin (f) having 4 to 20 carbon atoms are contained as the constitutional unit derived from the α-olefin (b), and a ratio of the number of moles e of the constitutional unit derived from the propylene (e) to the total number of moles a of the constitutional unit derived from the ethylene (a), moles f of the constitutional unit derived from the α-olefin (f) having 4 to 20 carbon atoms, moles c of the constitutional unit derived from the cyclic olefin (c), and moles d of the constitutional unit derived from the polyene (d), namely e/(a+f+c+d), is in the range of 99/1 to 50/50.

7. The polyolefin polymer containing vinyl groups at both ends thereof according to claim 1, wherein constitutional units derived from the α-olefin (b), the constitutional units derived from the cyclic olefin (c), and ethylene (a) are contained, constitutional units derived from propylene (e) and an α-olefin (f) having 4 to 20 carbon atoms are contained as the constitutional unit derived from the α-olefin (b), and a ratio of the number of moles f of the constitutional unit derived from the α-olefin (0 having 4 to 20 carbon atoms to the total number of moles a of the constitutional unit derived from the ethylene (a), moles e of the constitutional unit derived from the propylene (e), and moles c of the constitutional unit derived from the cyclic olefin (c), namely f/(a+e+c), is in the range of 99/1 to 50/50.

8. The polyolefin polymer containing vinyl groups at both ends thereof according to claim 2, wherein constitutional units derived from the α-olefin (b), the cyclic olefin (c), the polyene (d) and ethylene (a) are contained, constitutional units derived from propylene (e) and an α-olefin (1) having 4 to 20 carbon atoms are contained as the constitutional unit derived from the o-olefin (b), and a ratio of the number of moles f of the constitutional unit derived from the α-olefin (f) having 4 to 20 carbon atoms to the total number of moles a of the constitutional unit derived from the ethylene (a), moles e of the constitutional unit derived from the propylene (e), moles c of the constitutional unit derived from the cyclic olefin (c), and moles d of the constitutional unit derived from the polyene (d), namely f/(a+e+c+d), is in the range of 99/1 to 50/50.

9. A thermoplastic resin composition containing the polyolefin polymer containing vinyl groups at both ends thereof according to claim 1 and at least one kind of other thermoplastic resins (A).

10. A crosslinkable resin composition comprising the polyolefin polymer containing vinyl groups at both ends thereof according to claim 1, and at least one kind selected from the group consisting of sulfur (B-1), a compound (B-2) having at least two hydrosilyl groups in the molecule thereof, and an organic peroxide (B-3).

11. A crosslinked composition obtained by crosslinking at least part of the composition according to claim 10.

12. A molded article comprising the polyolefin polymer containing vinyl groups at both ends thereof according to claim 1.

13. A multilayered laminate having at least one layer comprising:

the polyolefin polymer containing vinyl groups at both ends thereof according to claim 1.

* * * * *